United States Patent
Shiga et al.

(10) Patent No.: US 7,380,019 B2
(45) Date of Patent: May 27, 2008

(54) PATH CONTROL METHOD

(75) Inventors: Kenta Shiga, Yokohama (JP); Atsuya Kumagai, Kawasaki (JP); Keisei Fujiwara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 10/801,720

(22) Filed: Mar. 17, 2004

(65) Prior Publication Data

US 2005/0188109 A1 Aug. 25, 2005

(30) Foreign Application Priority Data

Jan. 30, 2004 (JP) .................. 2004-022463

(51) Int. Cl.
*G06F 15/173* (2006.01)
(52) U.S. Cl. ............ 709/239; 709/241; 709/226; 709/212
(58) Field of Classification Search ......... 709/239, 709/241
See application file for complete search history.

(56) References Cited

U.S. PATENT DOCUMENTS

| | | | |
|---|---|---|---|
| 5,457,687 A | 10/1995 | Newman | |
| 5,726,977 A | 3/1998 | Lee | |
| 6,075,769 A | 6/2000 | Ghanwani et al. | |
| 6,259,705 B1 * | 7/2001 | Takahashi et al. | 370/465 |
| 6,389,448 B1 * | 5/2002 | Primak et al. | 718/105 |
| 6,408,358 B1 | 6/2002 | Uchiyama et al. | |
| 6,456,597 B1 * | 9/2002 | Bare | 370/252 |
| 6,574,667 B1 | 6/2003 | Blumenau et al. | |
| 6,625,691 B2 | 9/2003 | Obara et al. | |
| 6,757,291 B1 | 6/2004 | Hu | |
| 6,757,753 B1 | 6/2004 | DeKoning et al. | |
| 6,940,853 B2 * | 9/2005 | Yamada et al. | 370/389 |
| 7,009,987 B1 * | 3/2006 | Matsuzawa et al. | 370/409 |
| 7,016,971 B1 * | 3/2006 | Recio et al. | 709/233 |
| 7,215,677 B2 * | 5/2007 | Lung | 370/400 |
| 2002/0156910 A1 | 10/2002 | Senda | |
| 2003/0079018 A1 | 4/2003 | Lolayekar et al. | |
| 2003/0095501 A1 | 5/2003 | Hofner et al. | |
| 2003/0108052 A1 * | 6/2003 | Inoue et al. | 370/399 |
| 2003/0142628 A1 * | 7/2003 | Alonso et al. | 370/241 |
| 2003/0158940 A1 * | 8/2003 | Leigh | 709/226 |

(Continued)

FOREIGN PATENT DOCUMENTS

EP 0647081 A2 4/1995

(Continued)

*Primary Examiner*—Andrew Caldwell
*Assistant Examiner*—Michael D. Meucci
(74) *Attorney, Agent, or Firm*—Mattingly, Stanger, Malur & Brundidge, P.C.

(57) ABSTRACT

In a computer system in which a computer, storage devices, and a storage management device are connected by a network, the computer or a first storage device accesses a second storage device using a plurality of paths in the network, and the computer or the first storage device performs load balancing among the plurality of paths on the basis of a ratio set in advance, it is detected that congestion has occurred on a path, a ratio at the time of congestion of the path is calculated, and a difference between the ratio at the time of congestion and the ratio set in advance is allocated to a ratio of the other paths between the computer or the first storage device and the second storage device.

34 Claims, 19 Drawing Sheets

U.S. PATENT DOCUMENTS

| | | |
|---|---|---|
| 2003/0165137 A1* | 9/2003 | Soloway et al. ............ 370/389 |
| 2003/0182516 A1 | 9/2003 | Fujimoto |
| 2003/0236888 A1* | 12/2003 | Chauffour et al. .......... 709/226 |
| 2004/0024870 A1 | 2/2004 | Hirata et al. |
| 2004/0034751 A1 | 2/2004 | Horn et al. |
| 2004/0078632 A1* | 4/2004 | Infante et al. ................ 714/5 |
| 2004/0102925 A1 | 5/2004 | Giffords |
| 2004/0123028 A1 | 6/2004 | Kanal et al. |
| 2004/0128453 A1 | 7/2004 | Ido et al. |
| 2004/0158656 A1 | 8/2004 | Fujibayashi et al. |
| 2007/0124476 A1* | 5/2007 | Oesterreicher et al. ..... 709/226 |

FOREIGN PATENT DOCUMENTS

| | | |
|---|---|---|
| EP | 0805578 A2 | 11/1997 |
| EP | 1246415 A2 | 10/2002 |
| JP | 56129456 | 10/1981 |
| JP | 2000330924 | 11/2000 |
| JP | 2002-330924 | 11/2002 |
| WO | 03050708 | 6/2003 |
| WO | 2004010643 A1 | 1/2004 |

* cited by examiner

FIG. 5

| PATH ID | TASK ID | NETWORK ID | DEFAULT RATIO | RATIO | CONGESTION COUNT |
|---------|---------|------------|---------------|-------|------------------|
| PATH01  | TSK01   | TSK01      | 50            | 25    | 1                |
| PATH02  | TSK01   | TSK01      | 50            | 75    | 0                |
| ......  | ......  | ......     | ......        | ...... | ......          |

| INITIATOR IP ADDRESS | TARGET IP ADDRESS |
|----------------------|-------------------|
| 192.168.0.1          | 192.168.2.1       |
| 192.168.1.1          | 192.168.3.1 : 3261 |
| ......               | ......            |

FIG. 6

NETWORK REGISTRATION SCREEN — 600

NETWORK ID: [_____] — 601

NETWORK DEVICE — 602

DEVICE ID: [_____] — 603

SOURCE IP ADDRESS FOR CONGESTION OCCURRENCE/RECOVERY NOTIFICATION: [_____] — 604

605 — (ADD)   (DELETE) — 606

DEVICE LIST:

| NETWORK ID | DEVICE ID | SOURCE IP ADDRESS |
|---|---|---|
| WAN01 | DEV01 | 12.34.56.78 |
| WAN01 | DEV02 | 12.34.56.79 |

REMOTE COPY TASK REGISTRATION SCREEN ~700

- TASK ID: ~701
- INITIATOR iSCSI NAME: ~702
- INITIATOR LUN: ~703
- TARGET iSCSI NAME: ~704
- TARGET LUN: ~705

SETTING OF PATH ~706

- PATH ID: ~707
- NETWORK ID TO BE USED: 708 ~709
- INITIATOR IP ADDRESS: 710 ~711
- TARGET IP ADDRESS: 712 ~713
- ( USE NAME MANAGEMENT SERVER ) ~714
- RATIO: ~715

716 ( ADD )   ( DELETE ) 717

PATH LIST:

| TASK ID | PATH ID | INITIATOR IP ADDRESS | TARGET IP ADDRESS | RATIO |
|---------|---------|----------------------|-------------------|-------|
| TSK01 | PATH01 | 192.168.0.1 | 192.168.2.1 : 3260 | 50 |
| TSK01 | PATH02 | 192.168.1.1 | 192.168.3.1 : 3260 | 50 |

~718

SETTING OF LOAD BALANCING ~719

720 ~ [✓] CHANGE RATIO OF LOAD BALANCING AT THE TIME OF CONGESTION

RATIO CHANGE RATE OF CONGESTED PATH (%): ~721

( OK )   ( Cancel )

728   729

PATH CONTROL METHOD

CROSS-REFERENCES TO RELATED APPLICATIONS

This application relates to and claims priority from Japanese Patent Application No. 2004-022463, filed on Jan. 30, 2004, the entire disclosure of which is incorporated herein by reference.

BACKGROUND OF THE INVENTION

1. Field of the Invention

The present invention relates to a storage device and an information processing apparatus which are connected to a network.

2. Description of the Related Art

In recent years, instead of a form of directly coupling a storage device to a computer (hereinafter also referred to as "host"), a form of connecting one or more storage devices to a plurality of hosts via a network has been frequently used. This connection form for storage devices using a network is called a storage area network (hereinafter referred to as "SAN"). The SAN has been constructed by using a fibre channel (hereinafter referred to as "FC") technique so far. An FC-based SAN is referred to as an FC-SAN.

In the case in which the FC-SAN is constructed, in order to improve availability of an entire system, a host and a storage device are connected by a plurality of physical communication paths (hereinafter also referred to as "paths"). The host sends commands and data to the storage device using the respective paths to thereby balance loads on the paths. Examples of an algorithm for determining a ratio of use of a plurality of paths include a weighted round-robin with which commands and data to be sent are allocated to the respective paths at different ratios (e.g., 60% of commands to be sent are allocated to path 1 and 40% of commands to be sent are allocated to path 2). In addition, in the case in which it is detected that one path has become unusable due to a cause such as a failure of a switch constituting the FC-SAN or disconnection of a network, the host continues communication with the storage device using the remaining paths.

The load balancing among paths as described above is carried out not only in communication between a host and a storage device (hereinafter referred to as "host-to-storage communication") but also in communication between a storage device and another storage device (hereinafter referred to as "storage-to-storage communication"). Examples of the storage-to-storage communication include remote copy. The remote copy is a technique for transferring data, which is stored in a storage device, to another storage device set in a geographically distant site to copy and save the data.

One of path control techniques in the above-mentioned host-to-storage communication is disclosed in JP-A-2000-330924.

On the other hand, an IP-SAN has been attracting attention. IP-SAN is constructed by using a network adopting the Internet protocol (hereinafter referred to as "IP") (hereinafter referred to as "IP network") which requires less acquisition costs than an FC. In the case in which a host communicates with a storage device via the IP-SAN, iSCSI, which is a protocol encapsulating an SCSI protocol with TCP/IP, is mainly used.

SUMMARY OF THE INVENTION

In the case in which the host-to-storage communication or the storage-to-storage communication is performed in the IP-SAN, problems as described below occur in the path control technique disclosed in JP-A-2000-330924.

As described above, an FC is used as a network in JP-A-2000-330924. In the FC, a technique called buffer credit is used for flow control in communication. In the buffer credit, an endpoint of a network such as a host or a storage device and a switch, to which the endpoint is connected, exchange information on free sizes of buffers for temporarily storing received packets. In the same manner, switches adjacent to each other also exchange information on free sizes of buffers. Consequently, the respective devices transfer data such that packets exceeding the free size of the buffer are not sent on the network. Thus, congestion in the network never occurs basically in the FC. Therefore, in the first place, JP-A-2000-330924 does not take into account control of paths based upon congestion at all.

On the other hand, in the TCP/IP, a technique called sliding window is used for flow control. In the sliding window, endpoints exchange information on free sizes of buffers. Here, the endpoints send packets without taking into account a free size of a buffer of a switch constituting a network. Therefore, in the case in which packets sent out to the network have exceeded an allowable amount of the buffer of the switch, congestion occurs. If the congestion has occurred, the switch discards the received packets. Further, if the occurrence of the congestion is detected by means such as timeout, the endpoints lower a transmission rate of packets considerably in order to recover the network from the congestion. This mechanism is defined by RFC2581.

Therefore, if the conventional path control technique premised on the FC, in which congestion does not occur, is applied to the IP-SAN, a transmission rate of a path, in which congestion has occurred, falls significantly just like the mechanism of the TCP/IP. However, since the congestion is not taken into account in the conventional path control technique disclosed in JP-A-2000-330924 or the like, the respective endpoints continue to use the path with the low transmission rate at the same ratio of use. Therefore, throughput of packet transmission of the entire system falls significantly. In particular, fall of throughput at the time of input/output of data to and from a storage device causes a significant problem (delay in writing response, etc.).

Thus, the inventors have devised the invention described below.

More specifically, as an aspect of the present invention, there is provided a system including: a first device; a second device; a plurality of paths which connect the first device and the second device; and a third device which is connected to the first device, wherein the first device transfers data to the second device using the plurality of paths at a predetermined ratio, the third device detects congestion of the plurality of paths and notifies the first device of the congestion, and the first device changes the predetermined ratio among paths on the basis of the notification to transfer the data to the second device using the plurality of paths.

Note that, as an aspect of the present invention, the first device may be a computer or a storage device. In addition, the third device may be included in the first device.

Further, as an aspect of the present invention, it is also possible that the third device has information on the predetermined ratio and a rate of change of the predetermined ratio and, in the case in which congestion of the plurality of paths is detected, computes the ratio among paths after change on the basis of the rate of change, and sends information on the predetermined ratio among paths after change to the first device, and the first device transfers the data to the second device using the plurality of paths on the basis of the predetermined ratio among paths after change.

Moreover, as an aspect of the present invention, it is also conceivable that the plurality of paths have a network device for connecting the first device and the second device, and the third device obtains information on occurrence of congestion or recovery from congestion from the network device. Other aspects of the present invention will be apparent in the following description.

BRIEF DESCRIPTION OF THE DRAWINGS

In the accompanying drawings:

FIG. 5 is a diagram showing an example of a data structure of a path management table;

FIG. 6 is a diagram showing an example of display of a network registration screen;

FIG. 7 is a diagram showing an example of display of a remote copy task registration screen;

DESCRIPTION OF THE PREFERRED EMBODIMENTS

Figure 1:
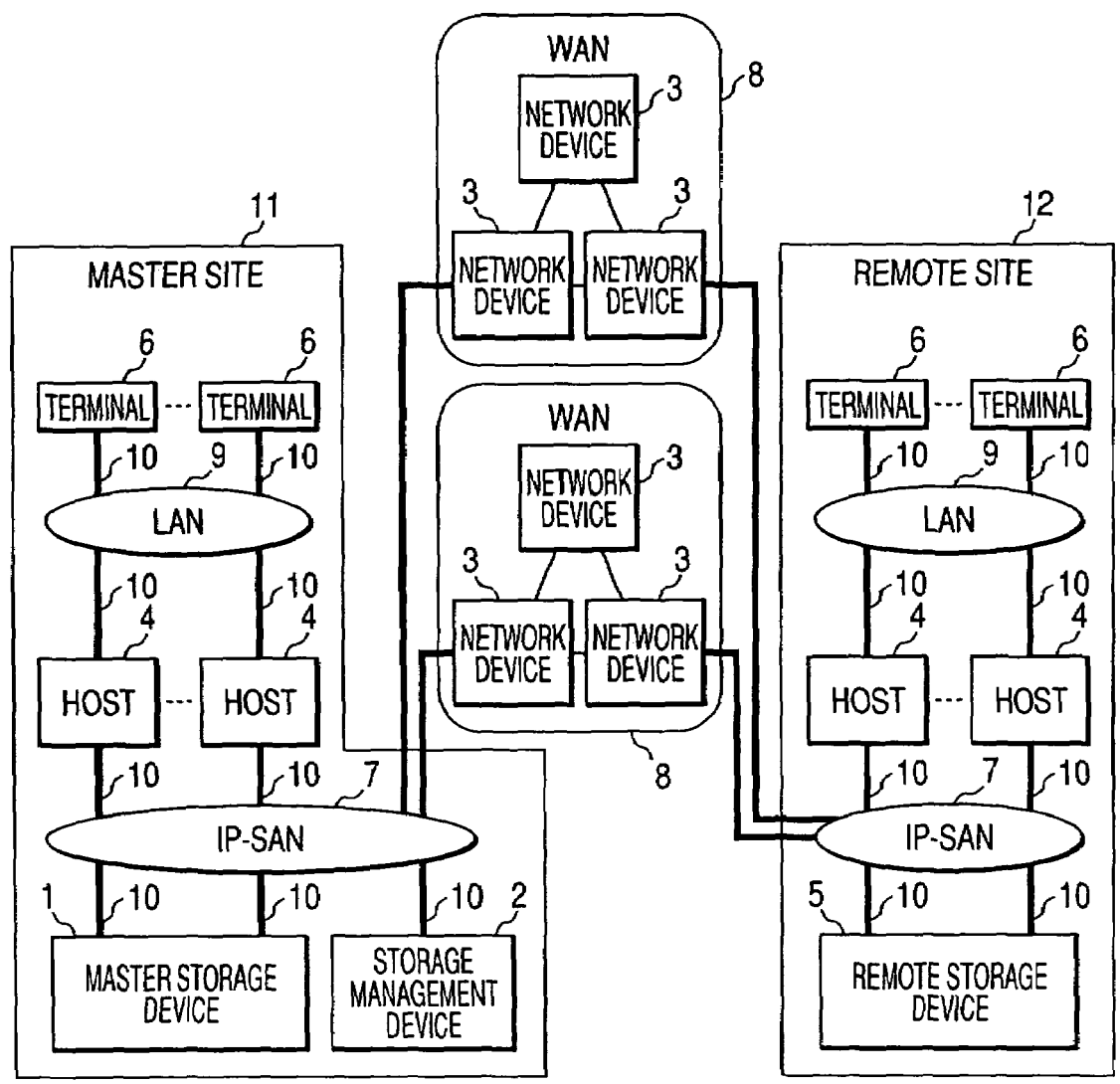
FIG. 1 is a diagram showing an example of a structure of a system in the first embodiment of the present invention.

Embodiments of the present invention will be hereinafter described with reference to the accompanying drawings. In the drawings referred to below, identical components are denoted by identical reference numerals and signs. However, the present invention is never limited to the embodiments, and all applications complying with the idea of the present invention correspond to the present invention.

In addition, unless specifically limited, components may be plural or singular.

The first embodiment relates to a system in which the present invention is applied to remote copy using iSCSI which is executed among storage devices. In the first embodiment, one storage device (hereinafter referred to as "master storage device) establishes one iSCSI session consisting of one or more TCP connections with the other storage device (hereinafter referred to as "remote storage device") to execute the remote copy. A route, on which packets to be sent by using the respective TCP connection pass, corresponds to one path.

FIG. 1 is a diagram showing an example of a structure of the system of the first embodiment. The system includes a master site 11, a remote site 12, and one or more WANs (Wide Area Networks) 8 which connect these sites. Note that "site" indicates a location where devices are set or a group of devices, for example, one building. In addition, in this embodiment, it is assumed that the master site 11 and the remote site 12 are apart from each other by a certain distance (e.g., the master site in Tokyo and the remote site in Osaka).

The master site 11 includes: a maser storage device 1; a storage management device 2 which manages the master storage device 1; hosts 4; terminals 6; an IP-SAN 7 which is an IP network connecting the hosts 4, the master storage device 1, and the storage management device 2; and a LAN 9 which is an IP network connecting the terminals 6 and the hosts 4. In addition, the master storage device 1, the storage management device 2, and the hosts 4 are connected to the IP-SAN 7 by communication lines 10 such as UTP (Unshielded Twisted Pair) cables or optical fibre cables. Similarly, the terminals 6 and the hosts 4 are connected to the LAN 9 by the communication lines 10.

Note that, in the case in which the devices such as the terminals 6 and the IP networks such as the IP-SAN 7 and the LAN 9 are connected using a radio communication technique, the communication lines 10 are unnecessary. In addition, although an example, in which the IP-SAN 7 and the LAN 9 are separately provided, is described in this embodiment, the IP-SAN 7 may also function as the LAN 9, that is, all the devices may be connected to the IP-SAN 7. In this case, costs for setting the system can be reduced. However, there is a problem in that a packet for the storage-to-storage communication and a packet used for communication among the terminals are mixed in one network to cause congestion in the network. In order to solve this problem, the structure of this embodiment is preferable.

The remote site 12 includes: a remote storage device 5; the hosts 4; the terminals 6; the IP-SAN 7 which connects the hosts 4 and the remote storage device 5; and the LAN 9 which connects the terminals 6 and the hosts 4. The remote storage device 5 and the hosts 4 are connected to the IP-SAN 7 by the communication lines 10. Similarly, the terminals 6 and the hosts 4 are connected to the LAN 9 by the communication lines 10. In the remote site 12, again, it is possible to adopt a structure in which there is only one network.

The hosts 4 and the terminals 6 are general computers, which have a CPU, a main memory, an input/output device, and the like. In addition, the hosts 4 and the terminals 6 have a network interface (hereinafter referred to as "NIF") serving as an interface for connecting the hosts 4 and the terminals 6 with the other devices via the communication lines 10.

The WANs 8 have one or more network devices 3 which transfer a received packet.

Figure 2A:
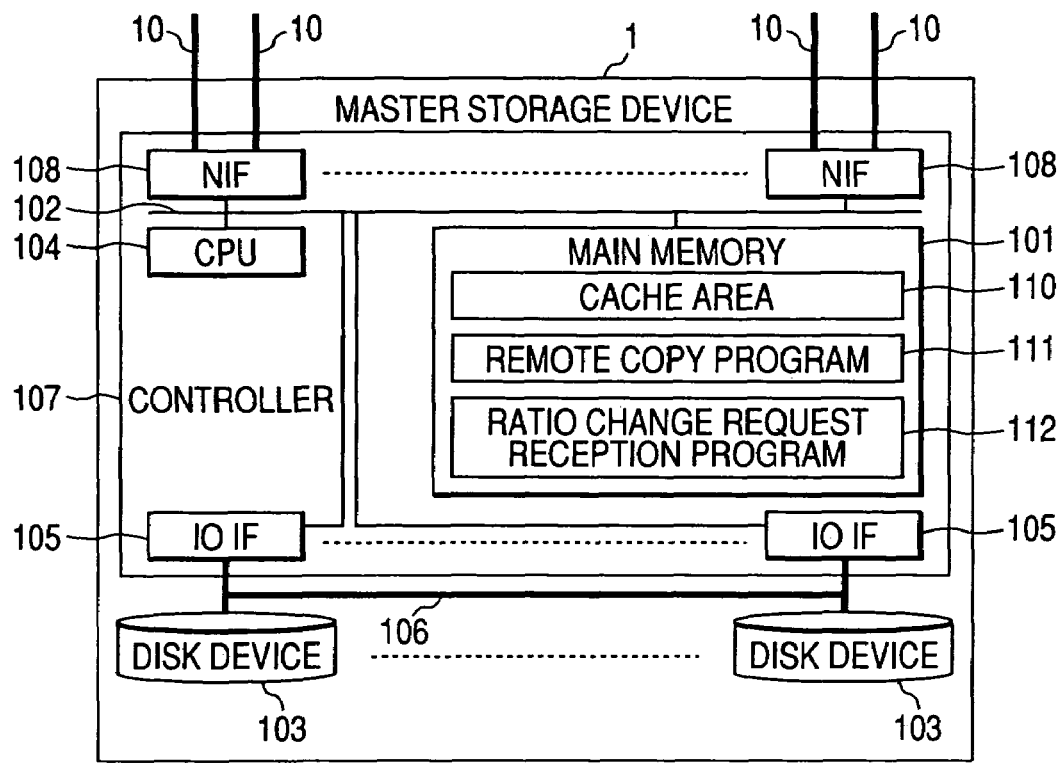
FIG. 2A is a diagram showing an example of a structure of a master storage device in the first embodiment.

FIG. 2A is a diagram showing an example of a structure of the master storage device 1. The master storage device 1 is a storage device system which has a single storage or a plurality of storages. Note that a device using a nonvolatile storage such as a hard disk drive or a DVD is included in the storage device. In addition, in the storage device system, a RAID configuration may be adopted. The master storage device 1 includes: storages (hereinafter referred to as "disk devices") 103; a controller 107 which controls writing and reading of data with respect to the disk devices 103; and a communication line 106 which connects the controller 107 and the disk devices 103.

The controller 107 includes: a volatile memory (hereinafter referred to as "main memory") 101; a communication line 102 such as a bus; a central processing unit (hereinafter referred to as "CPU") 104; IO interfaces (hereinafter referred to as "IO IFs") 105 serving as interfaces connecting the controller 107 and the communication line 106; and NIFs 108 which connects the controller 107 and the communication line 10.

The main memory 101 includes a cache area 110 which stores data read from the disk devices 103 or data received from the host or the like, a remote copy program 111 which is executed by the CPU 104 in executing remote copy, and a ratio change request reception program 112 which is executed by the CPU 104 in receiving a ratio change request from the storage management device 2.

Figure 2B:
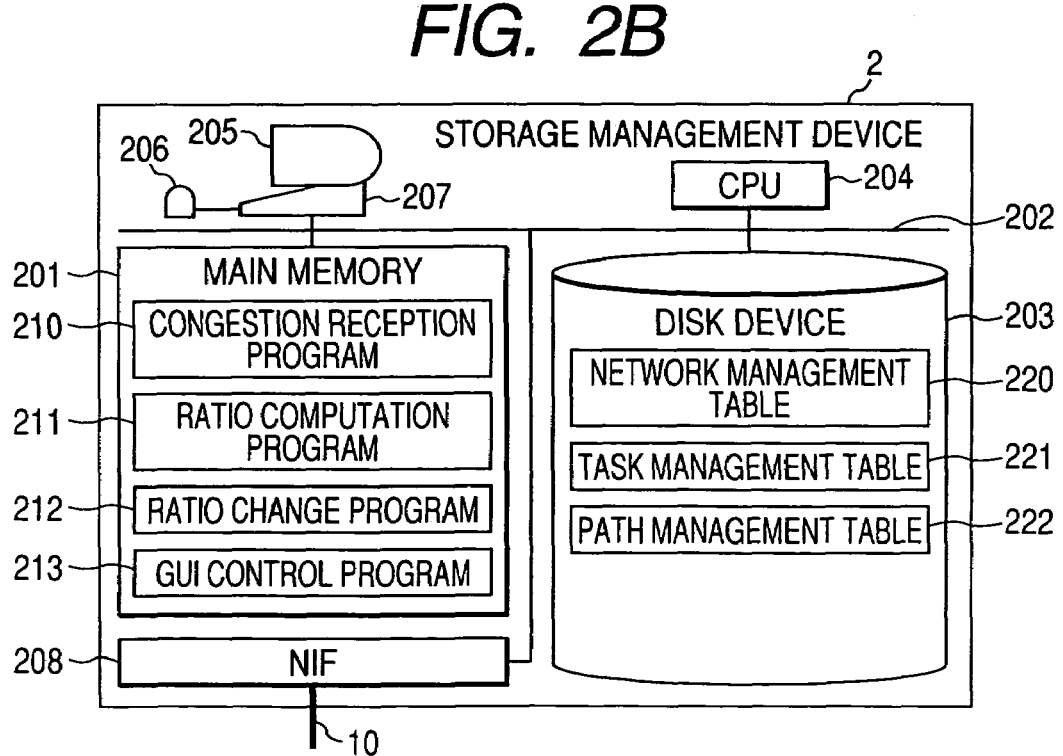
FIG. 2B is a diagram showing an example of a structure of a storage management device in the first embodiment.

FIG. 2B is a diagram showing an example of a structure of the storage management device 2. The storage management device 2 is a computer which includes: a main memory 201; a communication line 202; a disk device 203; a CPU 204, an output device (hereinafter referred to as "display") 205 such as a display device; a pointing device 206 such as a mouse; a character input device 207 such as a keyboard; and an NIF 208.

The main memory 201 stores a congestion reception program 210 which is executed by the CPU 204 in receiving a congestion occurrence notification or a congestion recovery notification from the network devices 3, a ratio computation program 211 which is executed by the CPU 204 in computing a ratio of load balancing among paths, a ratio change program 212 which is executed by the CPU 204 in sending a ratio change request to the master storage device 1 or the like, and a GUI control program 213 which is executed by the CPU 204 in providing a system administrator or the like with a graphical user interface.

Note that, here, the "ratio of load balancing among paths" (hereinafter also referred to simply as "ratio among paths" or "ratio of paths") is a numerical value which indicates how an amount (or number) of commands and data is shared in a group of paths used in the host-to-storage communication or the storage-to-storage communication. More specifically, in the case in which three paths are used in a certain kind of processing, the "ratio of load balancing among paths" indicates a set of "thirty percent", "thirty percent", and "forty percent" or respective numerical values of the set in the case in which thirty percent, thirty percent, and forty percent of packets included in the processing are sent on a first path, a second path, and a third path, respectively.

In addition, the disk device 203 stores a network management table 220 which stores information on the network devices 3 constituting the WANs 8, a task management table 221 which stores information necessary for the master storage device 1 to execute respective tasks of remote copy, and a path management table 222 which stores information on paths used between the master storage device 1 and the remote storage device 5. Here, the task indicates data transfer processing related to remote copy from a logical unit (LU) included in the master storage device 1 to a logical unit included in the remote storage device 2. Note that the LU is a logical storage area, which is constituted by a physical storage area, included in a disk device. The LU may be constituted by a storage area included in one disk device or may be defined as an aggregate of respective storage areas of a plurality of disk devices.

Note that, in the first embodiment, the respective tables are stored in the disk devices 203 such that the information stored in the respective tables is not lost even in the case in which a failure has occurred in the storage management device 2. However, the information of the respective tables may be stored in the main memory 201.

Note that the remote storage device 5 has the same structure as the master storage device 1 except that the ratio change request reception program 112 is not stored in the main memory 101.

Figure 3:
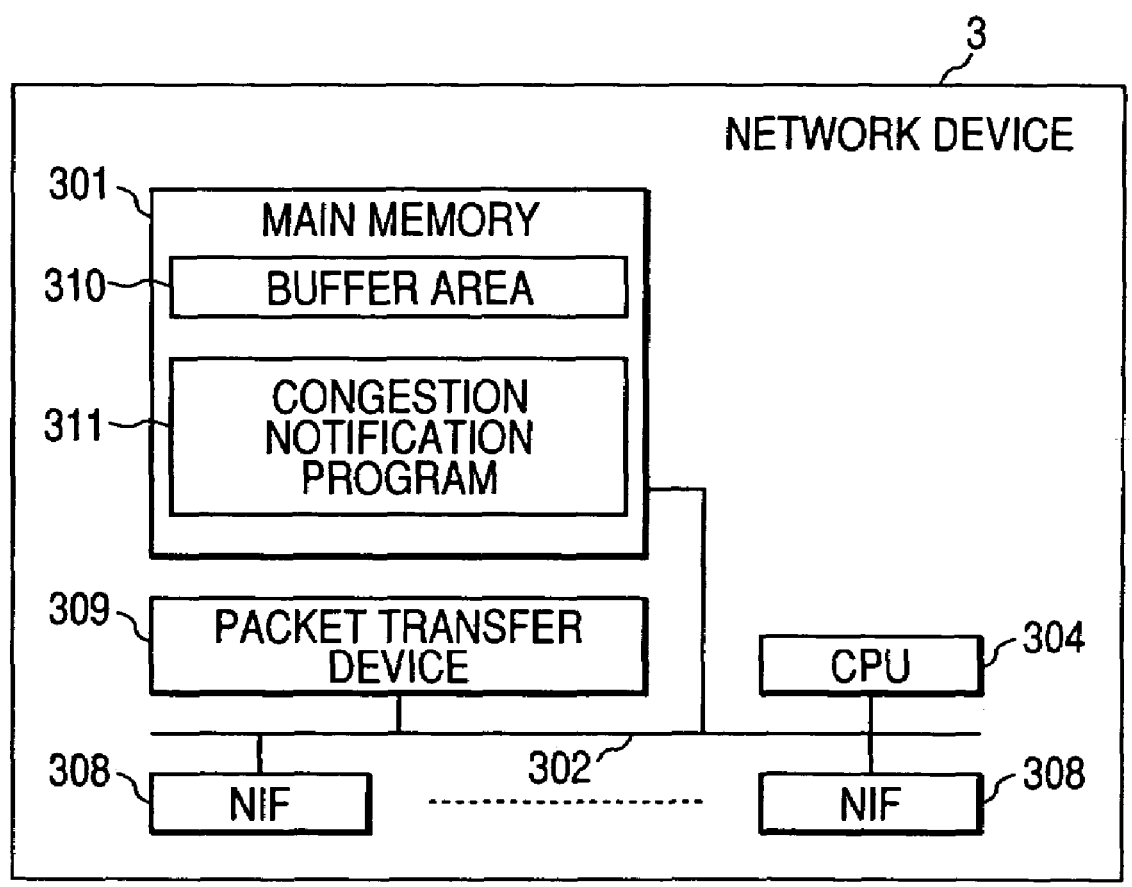
FIG. 3 is a diagram showing an example of a structure of a network device in the first embodiment.

FIG. 3 is a diagram showing an example of a structure of the network device 3. The network device 3 includes: a main memory 301; a communication line 302; a CPU 304; NIFs 308; and a packet transfer device 309 which sends a packet received by an NIF 308 to the other devices via another NIF 308. The main memory 301 stores a buffer area 310 which temporarily stores a packet waiting for transfer, and a congestion notification program 311 which is executed by the CPU 304 in sending a congestion occurrence notification to the storage management device 2 when a capacity of the buffer area 310 has become insufficient or in sending a congestion recovery notification to the storage management device 2 when a capacity of the buffer area 310 has become available.

Note that the above-mentioned programs are stored in a disk device or a memory in advance or by reading from a portable recording medium or download from other computers via a network. These programs are transferred to a main memory and executed by a CPU as required.

Next, data structures of the various tables stored in the disk devices 203 of the storage management device 2 will be described.

The network management table 220, the task management table 221, and the path management table 222 are formed in an array structure and are capable of storing one or more records. However, the data structures are not limited to the array structure.

Figure 4A:
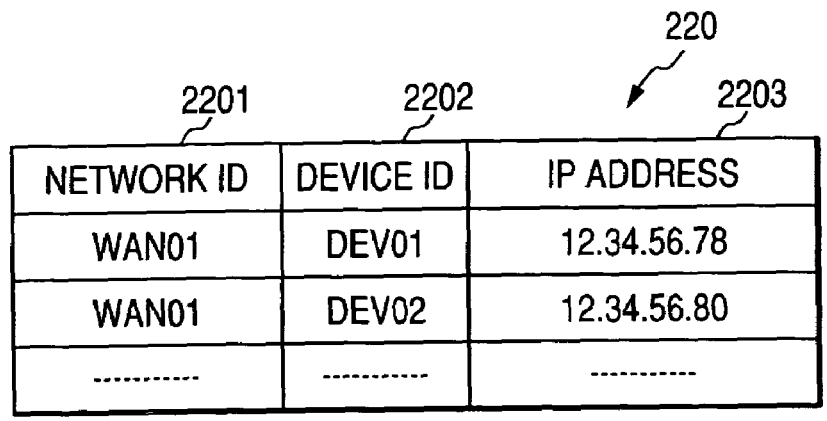
FIG. 4A is a diagram showing an example of a data structure of a network management table.

FIG. 4A is a diagram showing an example of a data structure of the network management table 220. The network management table 220 has records equivalent to the number of network devices 3 related to communication between the master storage device 1 and the remote storage device 5. The respective records of the network management table 220 have an entry 2201 in which a network ID serving as an identifier of a network, to which the corresponding network device 3 belongs, is registered, an entry 2202 in which a device ID serving as an identifier of the network devices 3 is registered, and an entry 2203 in which a source IP address of a congestion occurrence notification or a congestion recovery notification sent by the network devices 3 is registered.

Figure 4B:
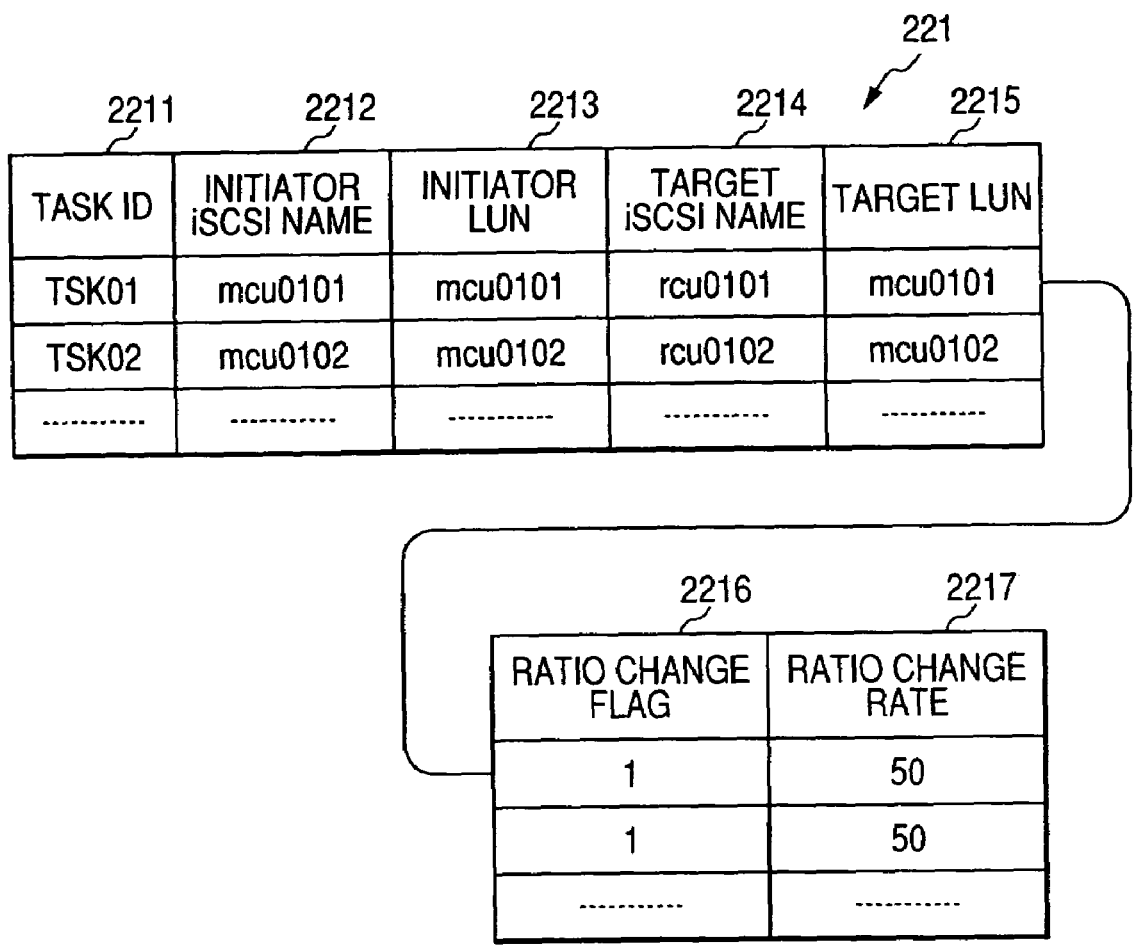
FIG. 4B is a diagram showing an example of a data structure of a task management table.

FIG. 4B is a diagram showing an example of a data structure of the task management table 221. The task management table 221 has one record for each task of remote copy. The respective records have an entry 2211 in which a task ID serving as an identifier of respective remote copy tasks is registered, an entry 2212 in which an initiator iSCSI name, which is an iSCSI name owned by the master storage device 1 operating as an iSCSI initiator, is registered, an entry 2213 in which an initiator LU number (LUN) serving as an identifier of a logical unit to be an object of copying is registered, an entry 2214 in which a target iSCSI name, which is an iSCSI name owned by the remote storage device 5 operating as an iSCSI target, is registered, an entry 2215 in which a target LUN for identifying an LU of a copy destination is registered, an entry 2216 in which a ratio change flag indicating whether or not to change a ratio of load balancing among paths when congestion has occurred is registered, and an entry 2217 in which a ratio change rate indicating a change rate of a ratio of load balancing of a path, in which congestion has occurred, is registered.

In the first embodiment, it is assumed that "0" in the entry 2216 indicates that ratio change is not performed when congestion has occurred, and "1" indicates that ratio change is performed when congestion has occurred. In addition, in the first embodiment, it is assumed that a value representing a ratio change rate in percentage is registered in the entry 2217. For example, in the case in which a value registered in the entry 2217 is "50", a ratio of load balancing of a path, in which congestion has occurred, is set to 50% of a previous ratio.

FIG. 5 is a diagram showing an example of a data structure of the path management table 222. The path management table 222 has one record for each path which is used in the host-to-storage communication or the storage-to-storage communication. The respective records of the path management table 222 has an entry 2221 in which a path ID serving as an identifier of respective paths corresponding to a record is registered, an entry 2222 in which a task ID of a remote copy task using the path corresponding to the record is registered, an entry 2223 in which a network ID of a network through which the path passes is registered, an entry 2224 in which a default ratio, which is a ratio at a point when congestion has not occurred on the path, is registered, an entry 2225 in which a ratio at the present time of the path is registered, an entry 2226 in which a count of congestion, which has occurred on the paths, is registered, an entry 2227 in which an initiator IP address, which is an IP address on the master storage device 1 side of the path, is registered, and an entry 2228 in which a target IP address, which is an IP address on the remote storage device 5 side of the path, is registered.

Note that, in the first embodiment, it is assumed that, in the case in which the remote storage device 5 uses a TCP port number other than "3260", which is a well-known port, for a communication port of iSCSI communication, a character string obtained by concatenating an IP address and the TCP port number with ":" is registered as a target IP address in the entry 2228. Here, the well-known port is a TCP port number which is assigned to an application layer protocol such as iSCSI decided by the IANA (Internet Assigned Numbers Authority).

In this embodiment, the storage management device 2 monitors a state of a path which is in use in the storage-to-storage communication. Here, when congestion has occurred, the network device 3 constituting the path notifies the storage management device 2 of the occurrence of the congestion. The storage management device 2, which has been informed of the occurrence of the congestion, computes a value of a ratio of paths after change, which the master storage device 1 uses, at a change rate set in advance, and sends a result of the computation to the master storage device 1. The master storage device 1, which has received the result, changes the ratio of the paths on the basis of the received information and continues the storage-to-storage communication.

First, a description will be made about processing procedures at the time when a system administrator or the like sets information such as a path of the storage-to-storage communication, a ratio of paths, and a ratio change rate to the storage management device 2 and the master storage device 1.

In the beginning, graphical user interfaces (hereinafter referred to as "GUIs") used in the first embodiment will be described. These GUIs are displayed on the display 205 by the CPU 204 executing the GUI control program 213. The system administrator or the like sets respective parameters on the displayed GUI using the character input device 207 and the pointing device 206.

Note that a computer separate from the storage management device 2 may include the display 205, the character input device 207, and the pointing device 206. For example, a console terminal connected to the storage management device 2 via the IP-SAN 7 or a serial cable may include the display 205 and the like. In this case, the CPU 204 executes the GUI control program 213 to send screen data to the console terminal, and the console terminal displays a GUI on the display 205. Moreover, the console terminal sends the respective parameters, which are set by the system administrator or the like using the character input device 207 and the pointing device 206, to the storage management device 2.

In addition, the storage management device 2 may include, instead of a GUI described in the first embodiment, a command line interface having a function equivalent to a function of the GUI.

FIG. 6 is a diagram showing an example of display of a network registration screen 600 which the system administrator or the like uses in order to register information on the network device 3 in the storage management device 2. The network registration screen 600 includes: an area 601 in which a network ID is inputted; an area 602 in which information on the network device 3 constituting the network is inputted; a button 605 which is used in adding the information inputted in the area 602 to the network management table 220; a button 606 which is used in deleting a record corresponding to the network device 3, which is designated by using an area 607, from the network management table 220; an area 607 in which a list of the network devices 3, which have already been registered in the network management table 220, is displayed; and a button 618 which is used in closing the network registration screen 600.

Moreover, the area 602 includes an area 603 in which a device ID of the network device 3 is inputted and an area 604 in which a source IP address of a congestion occurrence notification or a congestion recovery notification, which is sent by the network device 3, is inputted.

FIG. 7 is a diagram showing an example of display of a remote copy task registration screen 700 which a system administrator or the like uses in order to register information on a remote copy task and information on one or more paths used by the remote copy task in the storage management device 2. The remote copy task registration screen 700 includes: an area 701 in which a task ID is inputted; an area 702 in which an initiator iSCSI name is inputted; an area 703 in which an initiator LUN is inputted; an area 704 in which a target iSCSI name is inputted; an area 705 in which a target LUN is inputted; an area 706 in which information on paths is set; an area 719 in which a ratio of load balancing among paths is set; a button 728 which is used in registering the information designated in these areas; and a button 729 which is used in canceling a registration.

Moreover, the area 706 includes: an area 707 in which a path ID of a path is inputted; a button 709 which is used in displaying a list of network IDs of a network, through which the path passes, and selecting one of the network IDs; an area 708 in which the network ID selected by the button 709 is displayed; a button 711 which is used in displaying a list of initiator IP addresses of the path and selecting one of the initiator IP addresses; an area 710 in which the IP address selected by the button 711 is displayed; a button 713 which is used in displaying a list of target IP addresses of the path and selecting one of the target IP addresses; an area 712 in which a target IP address inputted by the administrator or the target IP address selected by the button 713 is displayed; a button 714 which is used in reading out an IP address and a port number, which correspond to the iSCSI name inputted in the area 704, from a name management server such as an iSNS (Internet Simple Naming Service) server or an SLP DA (Service Location Protocol Directory Agent) server and making them selectable by the button 713; an area 715 in which a ratio of load balancing of the path is inputted; a button 716 which is used in adding the information designated in the areas 707 to 715 in the path management table 222; a button 717 which is used in deleting a record corresponding to the path, which is designated using an area 718, from the path management table 222; and an area 718 which displays a list of paths which have already been registered in the path management table 222.

In addition, the area 719 includes: a button which is used to enable changing of a ratio of load balancing among paths at the time of congestion; and an area 721 in which data can be inputted when the button 720 is selected and a ratio change rate of a congested path is inputted in percentage.

Note that it is assumed that an IP address of the name management server, with which the storage management device 2 communicates when the button 714 is designated, is set in the storage management device 2 in advance.

Processing of the storage management device 2 at the time when various kinds of information are registered by a GUI operation will be described. Note that the processing described below is executed according to a GUI control program 213 which is executed by the CPU 204.

Figure 8A:
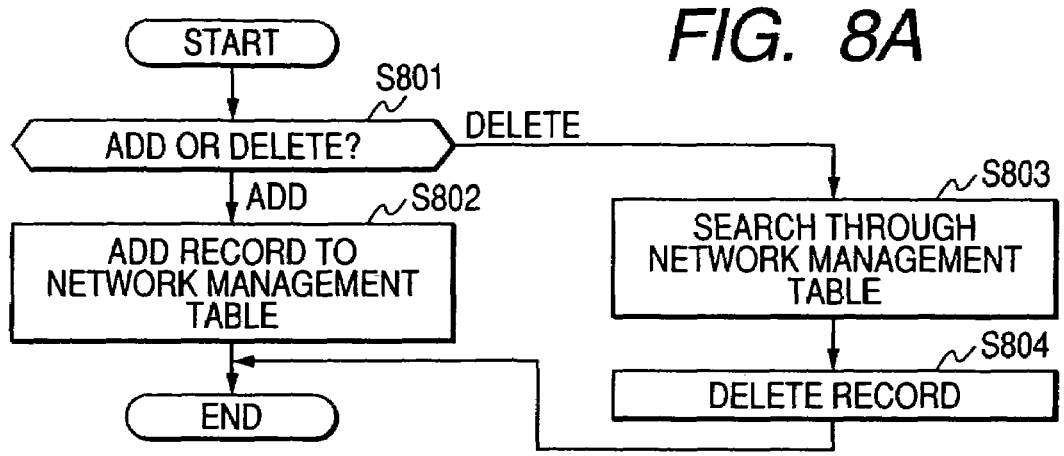
FIG. 8A is a flowchart showing an operation of network registration processing.

FIG. 8A is a flowchart showing operation procedures of network registration processing which is executed by the storage management device 2 when a system administrator or the like has designated the button 605 or the button 606 of the network registration screen 600. According to this processing, the system administrator or the like adds information on the network device 3 to the storage management device 2 or delete information on the network device 3 from the storage management device 2.

First, the storage management device 2 judges whether a designated button is the button 605 (add) or the button 606 (delete) (S801). If the button 605 is designated, the storage management device 2 adds a record in the network management table 220 on the basis of information inputted in the GUI. In the entry 2201, the entry 2202, and the entry 2203 of the record to be added, contents of the area 601, the area 603, and the area 604 at the time when the button 605 is designated are registered, respectively (S802). On the other hand, if the button 606 is designated, the storage management device 2 searches through the network management table 220 with a condition that the device ID of the network device 3 designated in the area 607 agrees with the contents of the entry 2202 when the button 606 is designated (S803). Then, the storage management device 2 deletes a found record from the network management table 220 (S804). Here, the storage management device 2 ends the network registration processing.

Figure 8B:
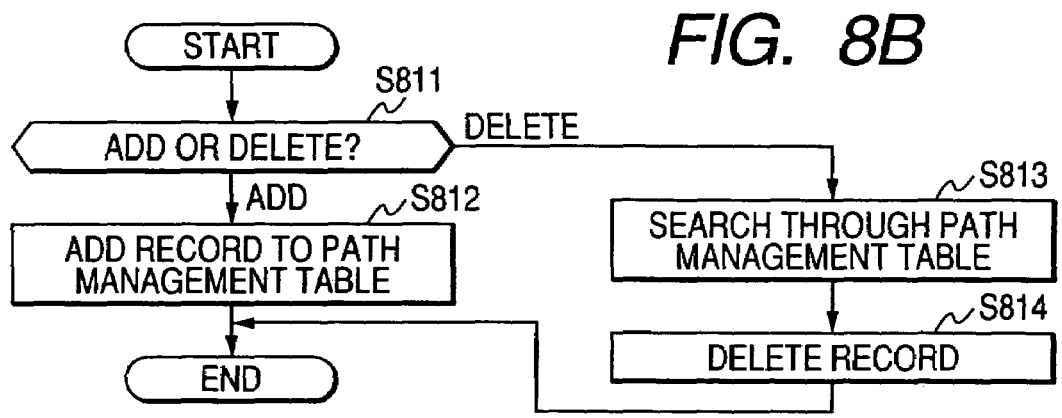
FIG. 8B is a flowchart showing an operation of path registration processing.

FIG. 8B is a flowchart showing operation procedures of path registration processing which is executed by the storage management device 2 when the system administrator or the like has designated the button 716 or the button 717 of the remote copy task registration screen 700. According to this processing, the system administrator or the like adds information on a plurality of paths to be used in one task of remote copy, a ratio of the paths, and necessity of a change of a ratio of the paths at the time of congestion or the like in the storage management device 2. In addition, according to this processing the system administrator or the like can change the number of paths to be used for remote copy, (an increase or a decrease of the number of paths, a change of a ratio of paths, etc) in the storage management device 2.

First, the storage management device 2 judges whether a designated button is the button 716 (add) or the button 717 (delete) (S811).

If the button 716 is designated, the storage management device 2 adds a record in the path management table 222 on the basis of information inputted in the GUI. Here, in the entries 2221, the entry 2222, the entry 2223, and the entry 2224 of a record to be added, contents of the area 707, the area 701, the area 708, and the area 715 at the time when the button 716 is designated are registered, respectively. Contents of the area 715 at the time when the button 716 is designated are also registered in the entry 2225. "0" is registered in the entry 2226. In the entry 2227 and the entry 2228, contents of the area 710 and the area 712 at the time when the button 716 is designated are registered, respectively (S812).

On the other hand, if the button 717 is designated, the storage management device 2 searches through the path management table 222 with a condition that the task ID and the path ID of the path designated in the area 718 agree with the contents of the entry 2222 and the entry 2221, respectively, when the button 717 is designated (S813). Then, the storage management device 2 deletes a found record from the path management table 222 (S814). Here, the storage management device 2 ends the path registration processing.

Figure 8C:
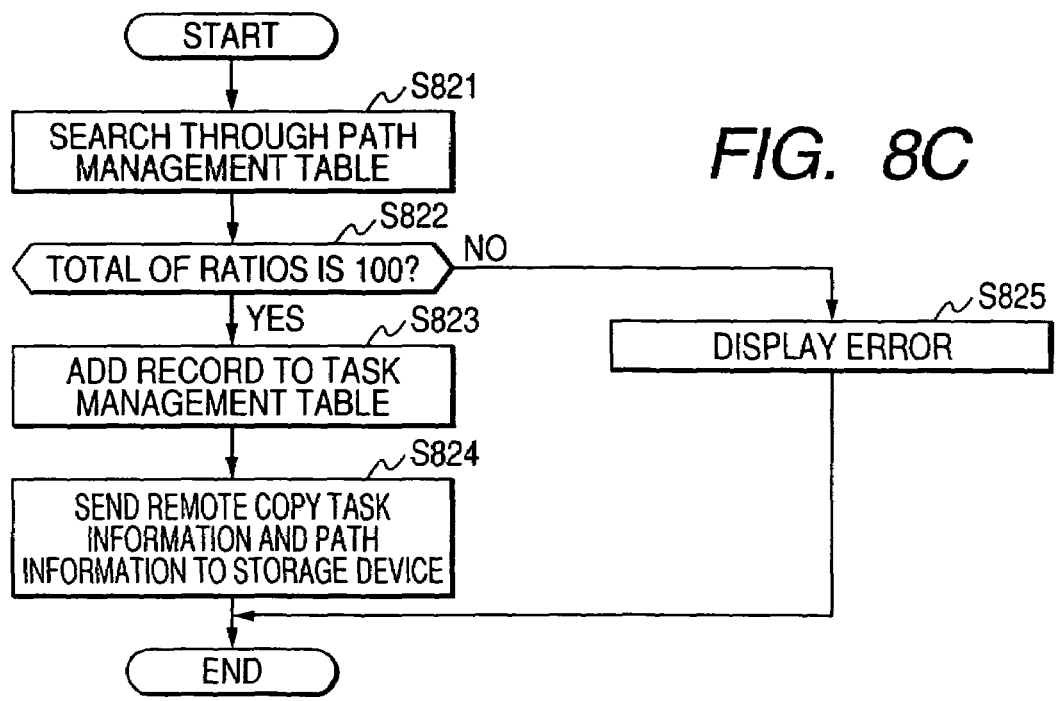
FIG. 8C is a flowchart showing an operation of remote copy task registration processing.

FIG. 8C is a flowchart showing operation procedures of remote copy task registration processing which is executed by the storage management device 2 when the system administrator or the like has registered information of one remote copy task using the remote copy task registration screen 700.

According to this processing, the system administrator or the like can confirm whether or not the registration of the path shown in FIG. 8B has been set correctly (a ratio of the paths is 100%) for one task and register information on the task in the storage management device 2.

First, the storage management device 2 searches through the path management table 222 with a condition that the task ID inputted in the area 701 agrees with contents the entry 2222 (S821). Then, the storage management device 2 extracts the entry 2225 (ratios) of all found records and confirms that a sum of the ratios is 100 (S822). If the sum of all the ratios is not 100, the storage management device 2 displays a GUI indicating an error on the display 205 and ends the remote copy task registration processing. In this case, the system administrator or the like performs registration of a path again (S825).

If the sum of all the ratios is 100, the storage management device 2 adds a record in the task management table 221. Here, contents of the area 701, contents of the area 702, contents of the area 703, contents of the area 704, and contents of the area 705 are registered in the entry 2211, the entry 2212, the entry 2213, the entry 2214, and the entry 2215 of the record to be added, respectively, in the entry 2216, if the button 720 is OFF, "0" is registered and, if the button 720 is ON, "1" is registered, and in the entry 2217, if the button 720 is OFF, "0" is registered and, if the button 720 is ON, contents of the area 721 are registered, respectively (S823).

Finally, the storage management device 2 creates a remote copy initialization request, which includes the information on the remote copy task registered in S823 (the task ID, the initiator iSCSI name, the initiator LUN, the target iSCSI name, and the target LUN) and information on all paths to be used in this remote copy task (path IDs, ratios, initiator IP addresses, and target IP addresses), and sends the remote copy initialization request to the master storage device 1 (S824). Here, the storage management device 2 ends the remote copy task registration processing. Thereafter, the master storage device 1, which has received the remote copy initialization request, executes the remote copy execution program 111 with the CPU 104 to perform remote copy initialization processing.

First, the master storage device 1 stores in the disk device 103 the information on the remote copy task and the information on paths extracted from the received remote copy initialization request. Then, the master storage device 1 establishes an iSCSI session with the remote storage device 5. The initiator iSCSI name extracted from the received remote copy initialization request is adopted as an iSCSI name of an initiator of this iSCSI session, and the target iSCSI name extracted from the received remote copy initialization request is adopted as an iSCSI name of a target of this iSCSI session.

In addition, for each piece of information on paths extracted from the received remote copy initialization request, the master storage device 1 establishes a TCP connection, which adopts the initiator IP address as a source IP address and the target IP address as a destination IP address, with the remote storage device 5, and assigns the TCP connection to the iSCSI session which has already been established.

Finally, the master storage device 1 executes initial copy using the established iSCSI session. In this initial copy, the master storage device 1 copies data stored in the logical unit of the master storage device 1, which is identified by the initiator LUN extracted from the received remote copy initialization request, to the logical unit of the remote storage device 5 which is identified by the target LUN extracted from the received remote copy initialization request.

Note that, in this embodiment, the storage management device 2 instructs the master storage device 1 to perform not only registration of information on a task and a path of a remote copy but also initialization (initial copy) and start of the remote copy on the basis of a remote copy initialization request. However, it is also possible that, in information registration by the system administrator or the like, the storage management device 2 performs only transmission of information on a task and a path of remote copy to the master storage device 2 and, thereafter, when an instruction to start of (or start of preparation for) the remote copy from the system administrator (or a user of the host 4) is received, the storage management device 2 (or the host 4) instructs the master storage device 1 to perform initialization processing of the remote copy. In this case, when the information on paths of the remote copy is received, the master storage device 1 performs only processing for storing the information in the disk device 103. Thereafter, when the initialization processing of the remote copy is instructed, the master storage device 1 performs processing such as establishment of a session and initialization copy on the basis of the stored information.

After the end of the processing based upon the remote copy initialization processing (or after the receipt of the remote copy initialization request), the master storage device 1 starts the remote copy. During execution of the remote copy, the storage management device 2 monitors a state of paths which are used in the remote copy.

Next, a description will be made about a communication sequence among the respective devices in the case in which congestion has occurred in the network device 3 when the master storage device 1 is executing the remote copy in the first embodiment.

Figure 9:
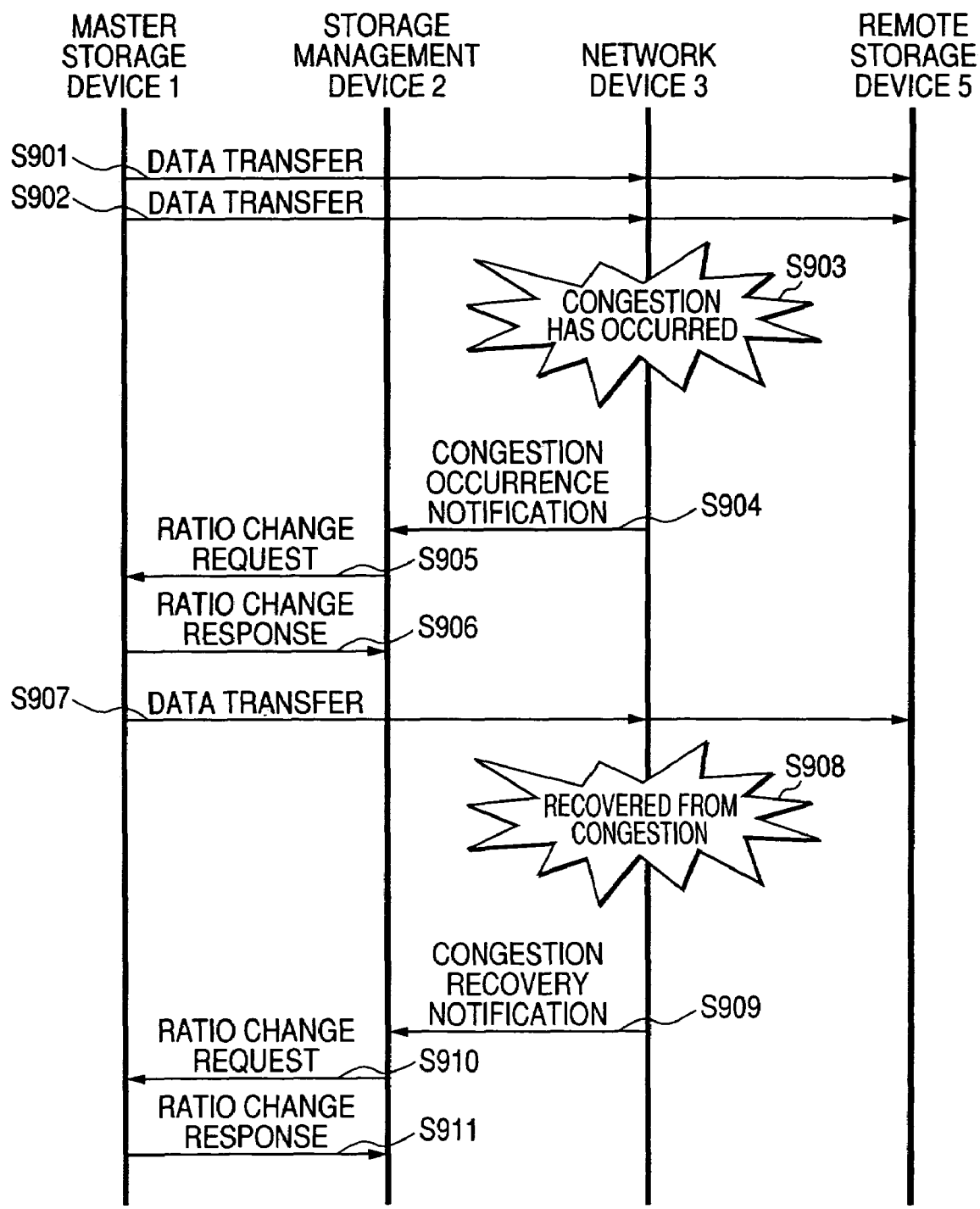
FIG. 9 is a diagram showing an example of a communication sequence in the first embodiment.

FIG. 9 is a diagram showing an example of a communication sequence among the devices from a time when congestion has occurred in the network device 3 while remote copy is being executed between the master storage device 1 and the remote storage device 5 until a time when the network device 3 is recovered from the congestion.

First, when a data write request is received from the host 4, the master storage device 1 transfers the written data to the remote storage device 5. Here, the master storage device 1 selects a TCP connection, which is used for data transfer, in accordance with the ratio of paths received from the storage management device 2 in the remote copy initialization processing. For example, in the case in which the master storage device 1 uses two paths for communication with the remote storage device 5 and a ratio of paths is 50% for both the paths, the master storage device 1 executes the data transfer of S901 using a TCP connection corresponding to a first path and executes the data transfer of S902 using a TCP connection corresponding to a second path (S901, S902).

Thereafter, when congestion has occurred in the network device 3 (S903), the network device 3 sends a congestion occurrence notification to the storage management device 2 (S904).

The storage management device 2, which has received the congestion occurrence notification, executes path management table update processing and ratio computation processing to obtain a ratio among paths after change. Then, the storage management device 2 sends a ratio change request for the paths to the master storage device 1 (S905). The master storage device 1, which has received the ratio change request extracts the ratio among paths after change from the ratio change request and stores the ratio in the disk device 103 to thereby change a value of the ratio among paths before change to a value after change, and then sends a ratio change response to the storage management device 2 (S906).

Thereafter, the master storage device 1 sends data, which is to be copied, to the remote storage device 5 using the ratio among paths after change. For example, when the ratio among paths is changed to 75% and 25%, in data transfer, the master storage device 1 uses the TCP connection corresponding to the first path at a ratio of three times in four times and uses the TCP connection corresponding to the second path at a ratio of once in four times (S907).

Thereafter, when the network device 3 has recovered from the congestion which has occurred therein (S908), the network device 3 sends a congestion recovery notification to the storage management device 2 (S909). The storage management device 2, which has received the congestion recovery notification, executes the path management table update processing and the ratio computation processing to obtain a ratio among paths after change.

Then, the storage management device 2 sends a ratio change request for the paths to the master storage device 1 (S910). The master storage device 1, which has received the ratio change request, changes the ratio among paths and then sends a ratio change response to the storage management device 2 (S911). Then, the master storage device 1 transfers the data to the remote storage device 5 using the ratio among paths after change.

In the first embodiment, it is assumed that the network device 3 sends a congestion occurrence notification and a congestion recovery notification to the storage management device 2 via the WAN 8 and the IP-SAN 7 using SNMP (Simple Network Management Protocol) Trap. Here, an OID (Object Identifier) representing congestion occurrence and congestion recovery is included in the congestion occurrence notification and the congestion recovery notification using the SNMP Trap, respectively. However, the network device 3 may notify the storage management device 2 of occurrence and the like of congestion using protocols other than this.

Next, detailed processing procedures of the path management table update processing and the ratio calculation processing illustrated in FIG. 9 will be described. An outline of the processing procedures is as described below. First, the storage management device 2 specifies a path related to the network device 3 in which congestion has occurred. Next, the storage management device 2 selects a task which uses the specified path. Thereafter, the storage management device 2 computes a value of a ratio among paths after change in the case in which a change of a ratio among paths is required in the selected task and sends a result of the computation to the storage device, which is executing the task, as a ratio change request.

Figure 10:
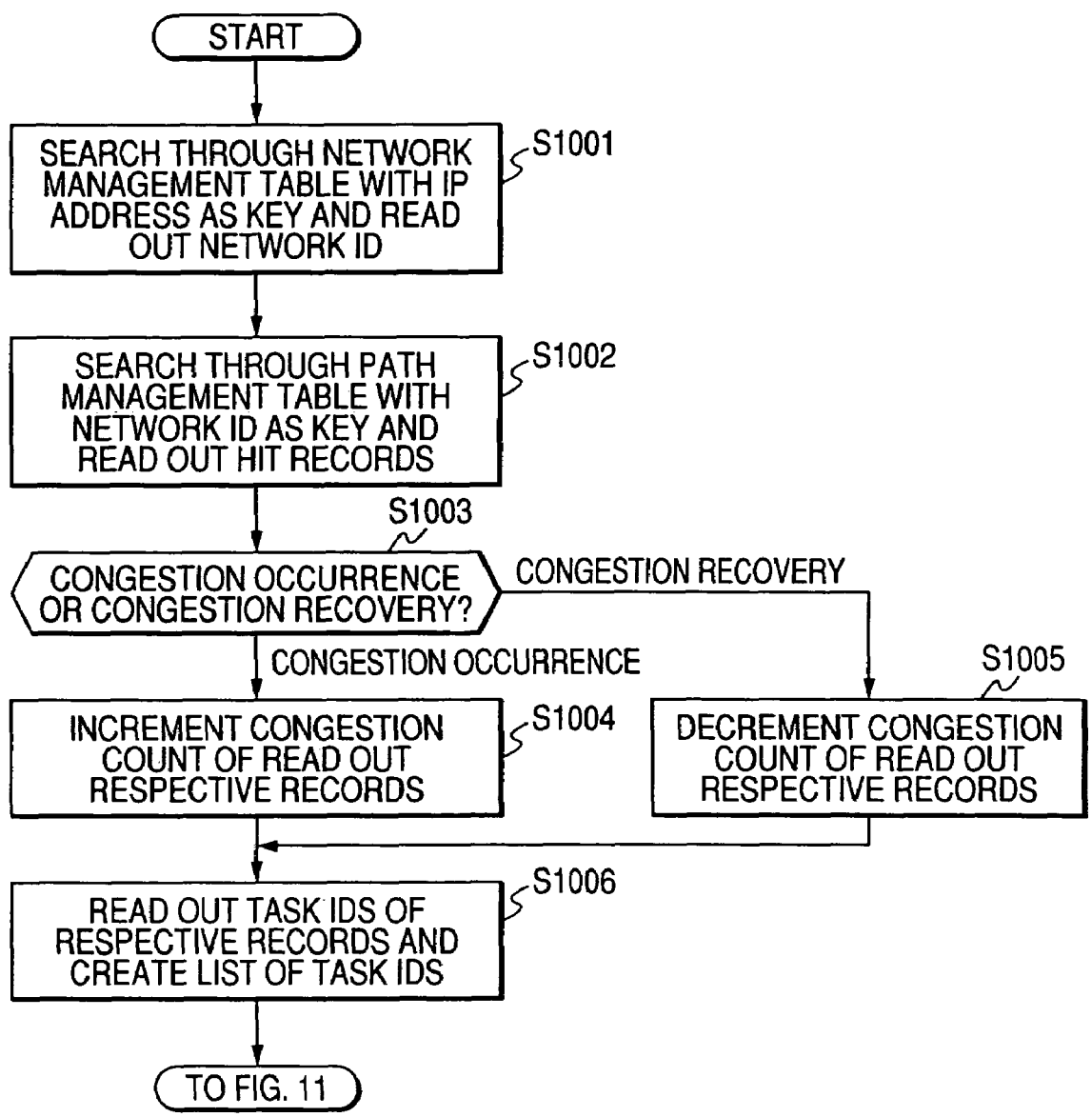
FIG. 10 is a flowchart showing an operation of path management table update processing in the first embodiment.
Figure 11:
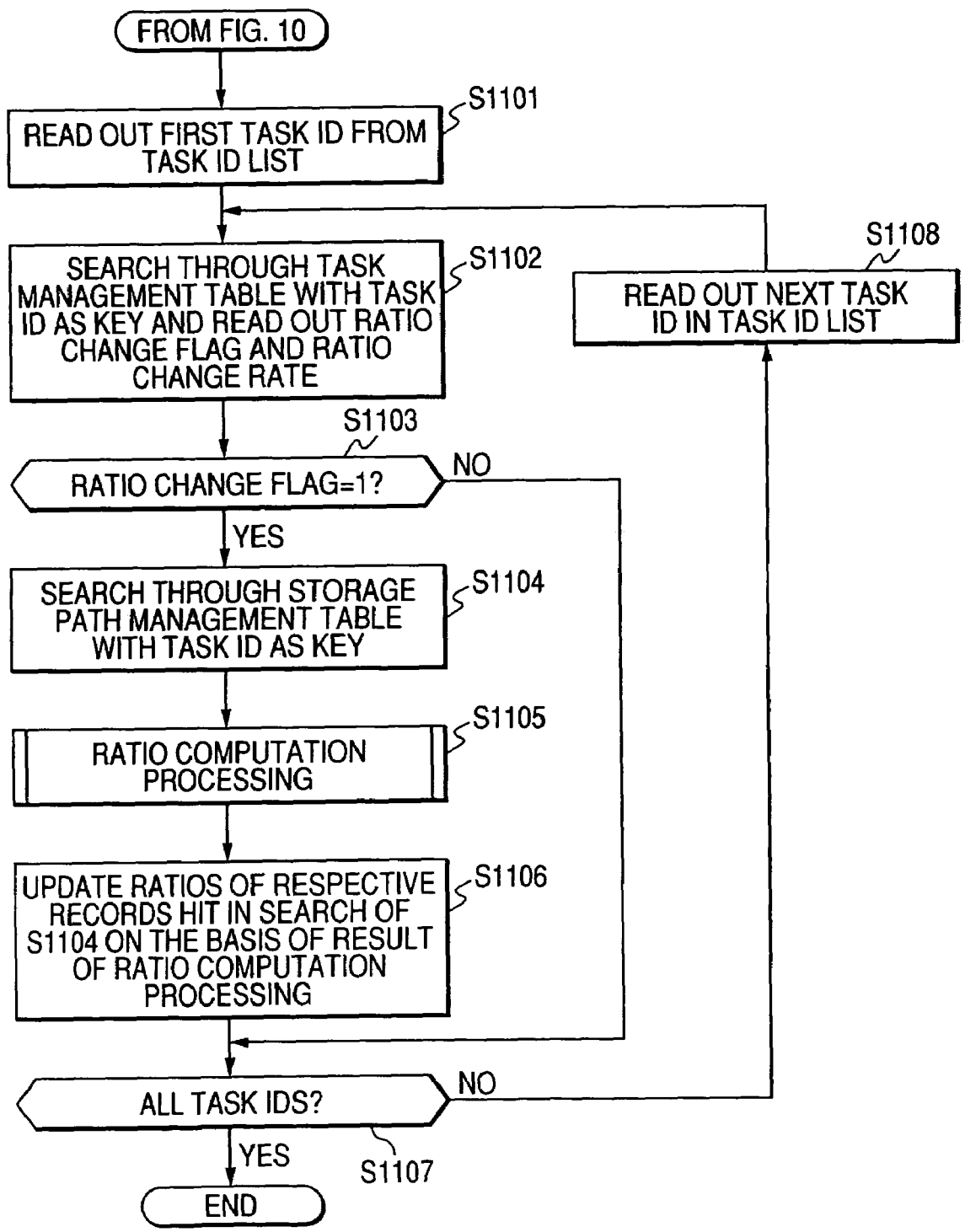
FIG. 11 is a flowchart showing the operation of the path management table update processing in the first embodiment.

FIGS. 10 and 11 are flowcharts showing operation procedures of the path management table update processing in the storage management device 2. Note that the processing described below is executed as the ratio calculation program 211 is executed by the CPU 204.

First, the storage management device 2, which has started the path management table update processing, searches through the network management table 220 with a condition that the value registered in the entry 2203 of the path management table 220 agrees with the IP address of the network device 3 which has sent the received congestion occurrence notification. Then, the storage management device 2 reads out a network ID (entry 2201) of a corresponding record (S1001).

Next, the storage management device 2 searches through the path management table 222 with a condition that the value registered in the entry 2223 agrees with the network ID read out in S1001. Then, the storage management device 2 reads out all records which match the search condition (S1002).

Next, the storage management device 2 judges whether the notified contents indicate congestion occurrence or congestion recovery (S1003). In the case of the congestion occurrence, the storage management device 2 adds 1 to values of congestion counts (entry 2226) of all the records read out in S1002 (S1004). On the other hand, in the case of the congestion recovery, the storage management device 2 subtracts 1 from values of congestion counts (entry 2226) of all the records readout in S1002 (S1005).

After performing addition or subtraction of the congestion counts, the storage management device 2 reads out task IDs (entry 2222) of the respective records read out in S1002 and creates a list of the task IDs. In this case, the storage management device 2 excludes redundant task IDs from the list (S1006).

(FIG. 11 will be hereinafter referred to) Next, the storage management device 2 selects a first task ID of the task ID list created in S1006 (S1101). Then, the storage management device 2 searches through the task management table 221 with a condition that the value registered in the entry 2211 agrees with the task ID selected in S1101. Thereafter, the storage management device 2 reads out a ratio change flag (entry 2216) and a ratio change rate (entry 2217) of a record matching the search condition (S1102).

Next, the storage management device 2 judges whether a value of the read-out ratio change flag is "0" or "1" (S1103). If the value of the ratio change flag is "1", the storage management device 2 searches through the path management table 222 with a condition that the value registered in the entry 2222 agrees with the task ID selected in S1101. Then, the storage management device 2 reads out all records matching the search condition (S1104) and executes ratio computation processing to be illustrated in FIG. 12 (S1105). The storage management device 2 updates ratios (values of entry 2225) of the respective records read out in S1104 (S1106). After the end of the processing of S1106 or if it is judged in S1103 that the ratio change flag is "0", the storage management device 2 executes the processing S1102 to S1106 with respect to all the task IDs included in the task ID list (S1107, S1108) and ends the path management table update processing.

Figure 12:
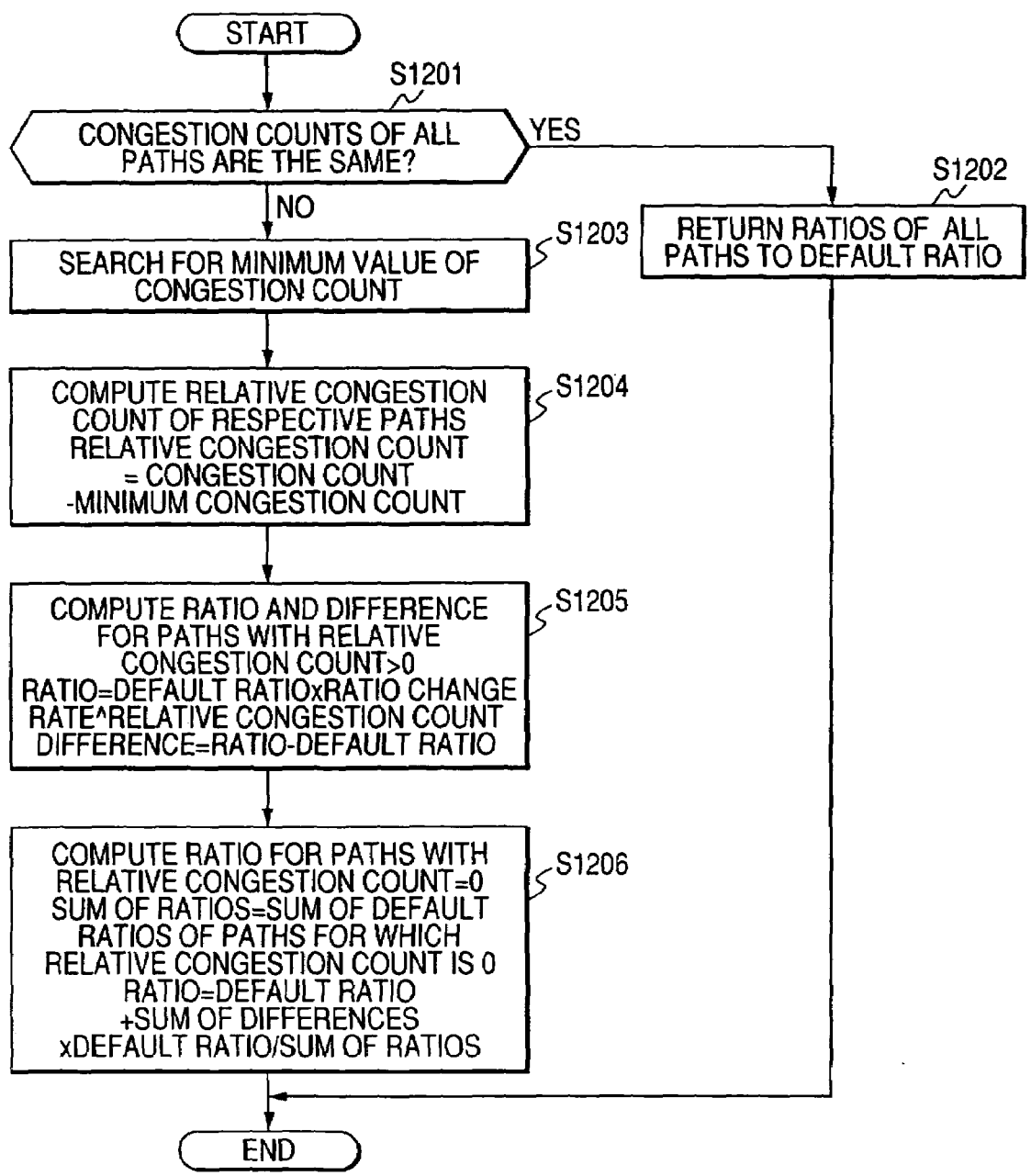
FIG. 12 is a flowchart showing an operation of ratio computation processing.

FIG. 12 is a flowchart showing operation procedures of the ratio computation processing in the storage management device 2. Note that the following processing is executed as the ratio computation program 211 is executed by the CPU 204. In the ratio computation processing, the storage management device 2 performs processing for reducing a ratio among paths, which is assigned to a path in which congestion has occurred, at a designated ratio change rate and allocating the reduced amount to the other paths. In addition, in the case in which the congestion counts of all the paths agree with each other (this is equivalent to a case in which the same number of congestion has occurred in all the paths used in the task) and in the case in which all the paths are recovered from the congestion, processing for returning the ratio among paths to the default value is performed in the ratio computation processing.

First, the storage management device 2 checks whether or not values of congestion counts (entry 2226) of all the records read out in S1104 of FIG. 11 agree with each other (S1201). If all the congestion counts agree with each other, the storage management device 2 overwrites the ratios among paths (entry 2225) of all the records read out in S1104 of FIG. 11 with the contents of the default ratio (entry 2224) (S1202) and ends the ratio computation processing.

On the other hand, if there is at least one different value of a congestion count among all the records read out in S1104, the storage management device 2 checks a minimum value of the congestion counts in all the records. A value obtained as a result of this step is referred to as a minimum congestion count (S1203). Next, the storage management device 2 computes relative congestion counts of paths, which correspond to the respective records read out in S1104 of FIG. 11, on the basis of the expression (S1204).

Relative congestion count=congestion count−minimum congestion count

Thereafter, the storage management device 2 computes a ratio among paths and a difference with respect to paths having the relative congestion count larger than 0 on the basis of the following expression (S1205). However, the mark "^" represents an exponential operation.

Ratio among paths=default ratio×(ratio change rate ^ relative congestion count)

Difference=ratio among paths−default ratio

In addition, the storage management device 2 computes a ratio among paths with respect to paths having the relative congestion count equal to 0 on the basis of the following expression (S1206).

Sum of ratios=sum of default ratios of paths having relative congestion count equal to 0

Ratio among path=default ratio+sum of all the differences computed in S1205×default ratio/sum of ratios After computing the above-mentioned ratios and the like, the storage management device 2 ends the ratio computation processing.

Concerning the above-mentioned ratio computation processing, for example, a case in which three paths are used for one remote copy task which is performed between storage devices, ratios of first, second, and third paths are 40(%), 30(%) and 30(%), respectively, and a ratio change rate at the time of congestion is 50(%) will be considered. In this case, when congestion has occurred on the first path, if the above-mentioned ratio computation processing is performed, the ratio of the first path changes to 20(%) and the ratios of the remaining paths change to 40(%), respectively.

The first embodiment has been described above. According to the first embodiment, in the case in which the master storage device 1 uses a plurality of paths between the master storage device 1 and the remote storage device 5 to execute remote copy which uses iSCSI, when congestion has occurred in the network device 3 on a certain path, the network device 3 notifies the storage management device 2 of the occurrence of the congestion. With this notification, the storage management device 2, which has been notified of the occurrence of the congestion, instructs the master storage device 1 to lower a use rate (which is referred to as a ratio here) of a path, in which a transmission rate has declined as a result of the congestion occurrence. Consequently, for example, decline in throughput of data transfer between storage devices in remote copy or the like can be controlled to be minimum.

Note that, in the first embodiment, the present invention is applied to the remote copy between the master storage device 1 located in the master site 11 and the remote storage device 5 located in the remote site 12. However, the present invention is also applicable to the storage-to-storage communication (e.g., remote copy) between two storage devices located in one site (e.g., the master site 11). In this case, the network device 3 is a device constituting the IP-SAN 7.

Next, a second embodiment will be described concerning differences from the first embodiment only. In the first embodiment, the network device 3 sends a congestion occurrence notification and a congestion recovery notification to the storage management device 2 using a protocol such as SNMP Trap. However, it is necessary to alter standard specifications of SNMP in order to send these notifications, and all the network devices 3 cannot always send the notifications.

On the other hand, in general, the network device 3 can store the number of discarded packets and send information on the number of discarded packets to external devices in response to a request from the external devices. Thus, in this embodiment, the storage management device 2 periodically reads out the information on the number of discarded packets from the network device 3 and compares the number of packets with a value read out last time, and if the number of discarded packets has increased, considers that congestion has occurred. On the other hand, when a fixed period has elapsed after the storage management device 2 considered that the congestion has occurred, the storage management device 2 reads out the number of discarded packet and compares the number of packets with the value read out last time, and if the number of discarded packets has not increased, considers that the network device 3 has recovered from the congestion. Consequently, in the system including the network device 3 which cannot send a congestion occurrence notification and a congestion recovery notification, a change of a ratio among paths according to occurrence of congestion is performed.

Figure 13A:
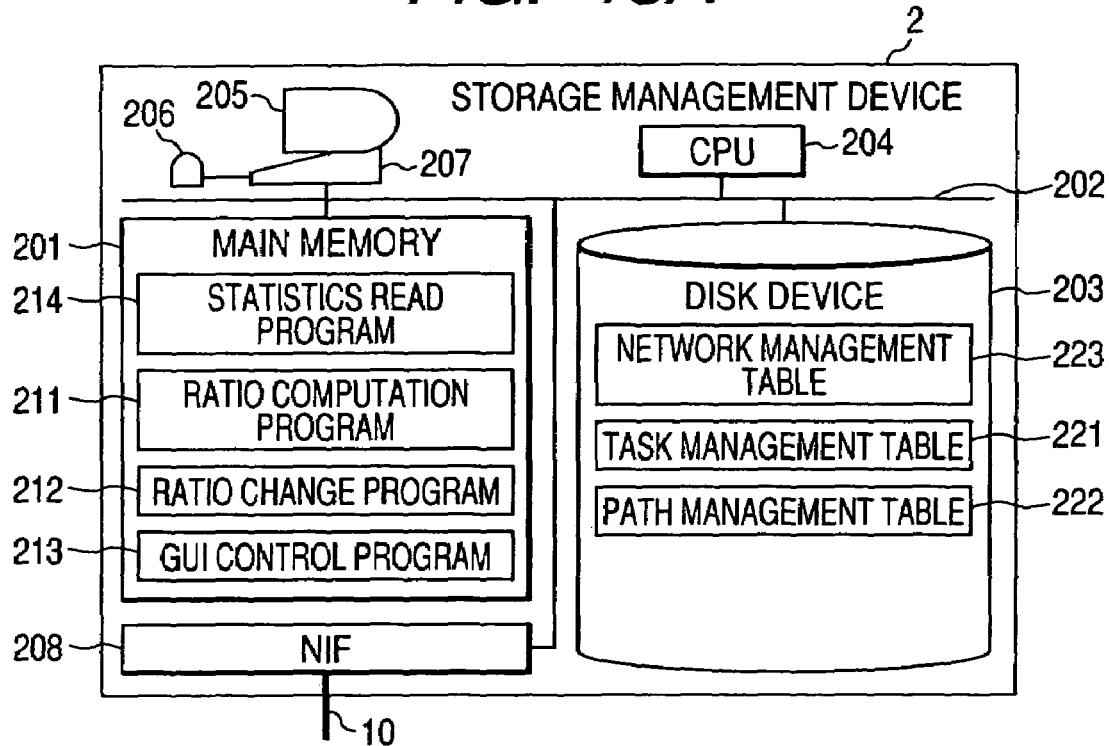
FIG. 13A is a diagram showing an example of a structure of a storage management device in the second embodiment.

FIG. 13A is a diagram showing an example of a structure of the storage management device 2 in the second embodiment. A network management table 223 is stored in the disk device 203 of the storage management device 2 instead of the network management table 220 of the first embodiment. Respective records of the network management table 223 have an entry 2204, in which the number of congestion discarded packet representing the number of packet discarded by the network device 3 due to lack of a buffer area is registered, in addition to the entries described in the first embodiment.

In the main memory 201 of the storage management device 2, a statistics read program 214, which is executed by the CPU 204 in periodically reading out statistics including information on the number of discarded packet from all the network devices 3 registered in the network management table 223, is stored instead of the congestion reception program 210 described in the first embodiment.

Figure 13B:
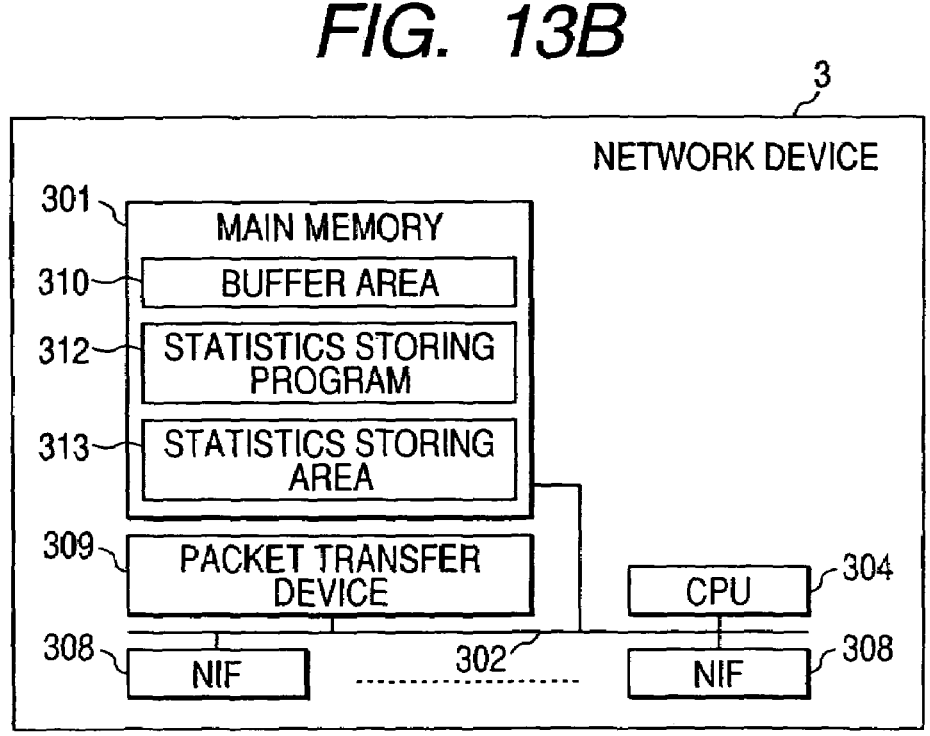
FIG. 13B is a diagram showing an example of a structure of a network device in the second embodiment.

FIG. 13B is a diagram showing an example of a structure of the network device 3 in the second embodiment. In the main memory 301 of the network device 3, a statistics storing area 313 storing various statistics and a statistic storing program 312, which is executed by the CPU 304 in writing the various statistics in the statistics storage area 313, are stored instead of the congestion notification program 311 described in the first embodiment.

Examples of the statistics stored in the statistics storing area 313 include a total number of discarded packet among packets received by the network device 3 (hereinafter referred to as "discarded packet total number"), the number of packets, which are discarded due to a format error of packets, among the packets of the discarded packet total number (hereinafter referred to as "error discarded packet number"), and the number of packets, which are discarded because the packets are packets of protocols which the network device 3 cannot cope with, among the packets of the discarded packet total number (hereinafter referred to as "protocol incorrect discarded packet number").

A congestion discarded packet number is represented by the following expression.

> Congestion discarded packet number=discarded packet total number−error discarded packet number−protocol incorrect discarded packet number The network registration processing in this embodiment is the same as the first embodiment except that the network management table 220 is replaced with the network management table 223 and that the number of congestion discarded packet at the point of addition of a record in the entry 2204 is registered in S802 of FIG. 8A. Here, the storage management device 2 sends a statistics request to the network device 3 corresponding to the record to be added and requests statistics such as a discarded packet total number, an error discarded packet number, and a protocol incorrect discarded packet number. Then, the storage management device 2 receives statistics response including the statistics requested by the network device 3 and computes a congestion discarded packet number on the basis of contents of the statistics response. Consequently, the storage management device 2 obtains the congestion discarded packet number at the point of the record addition.

Figure 14:
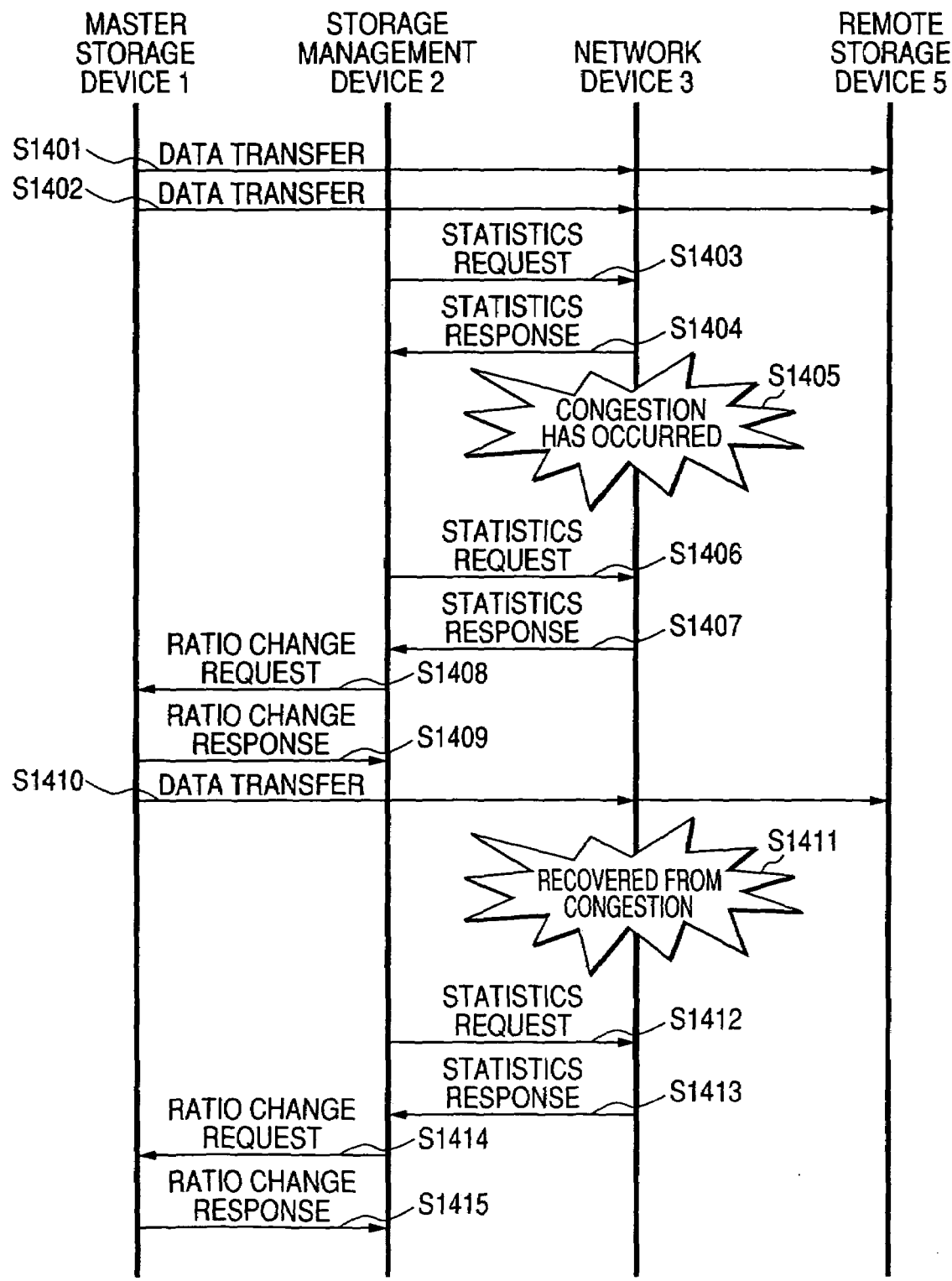
FIG. 14 is a diagram showing an example of a communication sequence in the second embodiment.

FIG. 14 is a diagram showing an example of a communication sequence among the respective devices in the system in the second embodiment. As in the first embodiment, it is assumed that the master storage device 1 is performing remote copy on the basis of information from the storage management device 2. First, the master storage device 1 performs transfer of data, which is to be copied, to the remote storage device 5 in accordance with a default ratio among paths (S1401, S1402). The storage management device 2 periodically sends a statistics request to the network device 3 and requests statistics such as a discarded packet total number, an error discarded packet number, and a protocol incorrect discarded packet number (S1403).

The network device 3, which has received the statistics request, sends a statistics response including the requested statistics (S1404). The storage management device 2, which has received the statistics response, computes a congestion discarded packet number on the basis of contents of the statistics response and compares the congestion discarded packet number with a value registered in the entry 2204 of the record, which corresponds to the network device 3, of the network management table 223. If these values agree with each other, the storage management device 2 considers that congestion has not occurred in the network device 3. In this sequence, it is assumed that these values agree with each other at this point.

It is assumed that, thereafter, congestion occurs in the network device 3 (S1405). The storage management device 2 sends a statistics request at predetermined timing (or a fixed interval) after the congestion occurrence (S1406) and receives a statistics response (S1407). Thereafter, the storage management device 2 computes a congestion discarded packet number on the basis of contents of the statistics response and compares the congestion discarded packet number with a value registered in the entry 2204 of the record, which corresponds to the network device 3, of the network management table 223. At this point, since the congestion has already occurred, the congestion discarded packet number exceeds the value registered in the entry 2204.

In this case, the storage management device 2 considers that the congestion has occurred in the network device 3 and writes the congestion discarded packet number in the entry 2204 of the record of the network management table 223.

Moreover, storage management device 2 performs the path management table update processing and the ratio computation processing described in FIGS. 10, 11 and 12. As a result, the storage management device 2, which has obtained a ratio among paths after change, sends a ratio change request for paths to the master storage device 1 (S1408) and receives a ratio change response (S1409). Thereafter, the master storage device 1 sends data, which is to be copied, to the remote storage device 5 using the ratio among paths after change (S1410).

It is assumed that, thereafter, the network device 3 is recovered from the congestion which has occurred therein (S1411). The storage management device 2 sends a statistics request at predetermined timing (e.g., periodically) (S1412) and receives a statistics response (S1413). The storage management device 2, which has received the statistics response computes a congestion discarded packet number on the basis of contents of the statistics response and compares the congestion discarded packet number with a value registered in the entry 2204 of the record, which corresponds to the network device, of the network management table 223. In this case, since the network device 3 has already recovered from the congestion, these values agree with each other. In this case, the storage management device 2 considers that the network device 3 has recovered from the congestion and performs the path management table update processing and the ratio computation processing illustrated in FIGS. 10, 11 and 12. The storage management device 2, which has obtained a ratio among paths after change of the path as a result of this processing, sends a ratio change request for the path to the master storage device 1 (S1414) and receives a ratio change response (S1415).

Note that, in the above-mentioned example of a communication sequence, after receiving the statistics response in S1407 and considering that congestion has occurred, the storage management device 2 receives the statistics response in S1413 and compares the congestion discarded packet number and the value registered in the entry 2204, and when the congestion discarded packet number and the value agree with each other, considers that the network device 3 has recovered from the congestion. However, it is also possible that the system administrator or the like can set arbitrarily how many times the congestion discarded packet number and the value registered in the entry 2204 should agree with each other continuously in order to consider that the network device 3 has recovered from congestion. This number of times only has to be a value found by rounding up a result which is obtained by dividing an average time from occurrence of congestion in the WAN 8 until recovery from the congestion by an interval at which the storage management device 2 sends a statistics request.

The second embodiment has been described. According to the second embodiment, the storage management device 2 periodically reads out statistics concerning a discarded packet from the network device 3 and judges congestion occurrence and congestion recovery, whereby an instruction for a change of a ratio or the like can be performed as in the first embodiment.

Next, a third embodiment will be described concerning differences from the first embodiment only. In the third embodiment, the network device 3 directly notifies the master storage device 1 of congestion occurrence and congestion recovery using standard specifications defined in RFC3168 called ECN (Explicit Congestion Notification). Therefore, compared with the first and the second embodiments, there is an advantage that an amount of communication between the storage management device 2 and the respective devices is reduced. Note that specifications of communication, which are used between the network device 3 and the master storage device 1, are not required to be limited to the ECN.

Figure 15A:
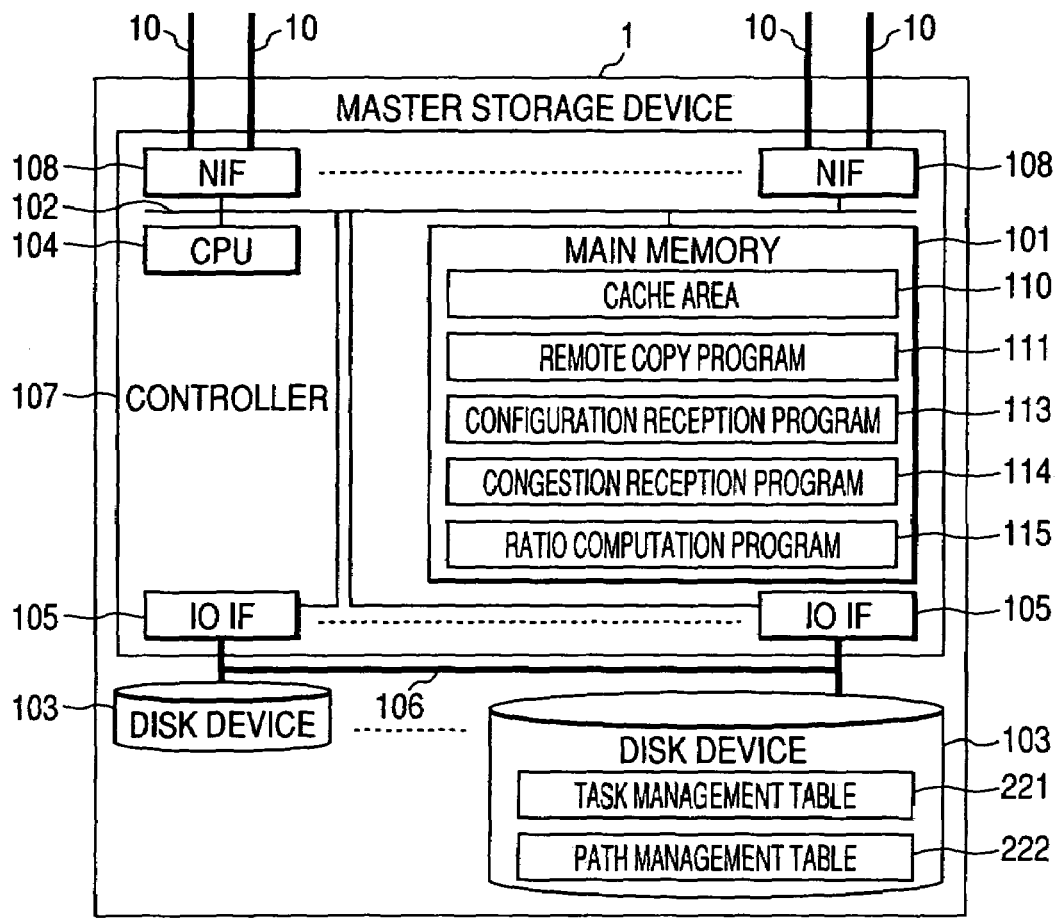
FIG. 15A is a diagram showing an example of a structure of a master storage device in the third embodiment.

FIG. 15A is a diagram showing an example of a structure of the master storage device 1 in the third embodiment. In the main memory 101 of the master storage device 1, a configuration reception program 113 which is executed by the CPU 104 when configuration contents inputted by the system administrator or the like has been received from the storage management device 2, a congestion reception program 114 which is executed by the CPU 104 when congestion occurrence or congestion recovery by the ECN has been received from the network device 3, and a ratio computation program 115 which is executed by the CPU 104 in calculating a ratio of load balancing among paths are stored instead of the ratio change request receipt program 111 described in the first embodiment.

In addition, a task management table 221 and a path management table 222 are stored in the disk device 103. In other words, processing such as ratio computation, which is performed in the storage management device 2 in the first and the second embodiments, is performed in the master storage device 1.

Figure 15B:
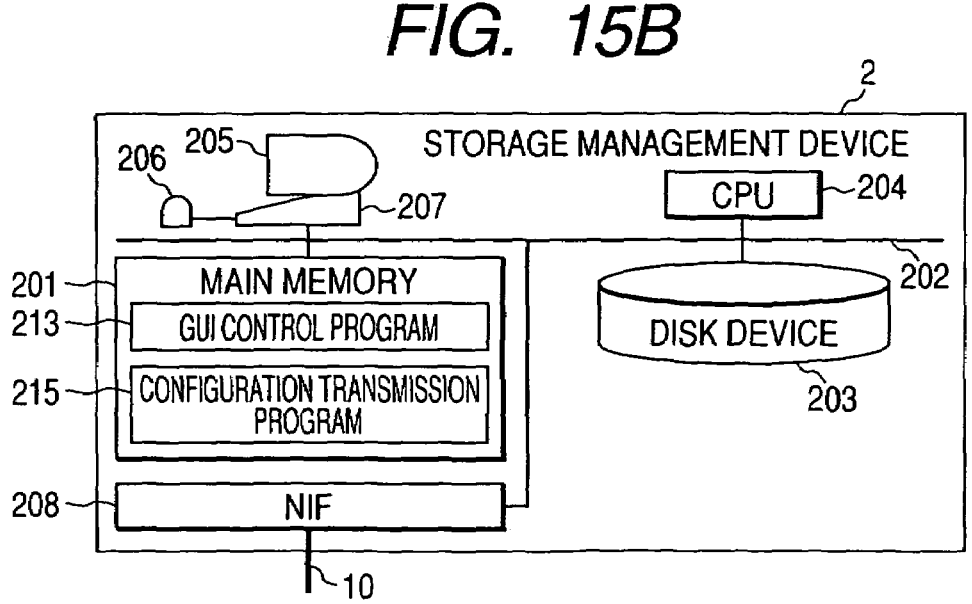
FIG. 15B is a diagram showing an example of a structure of a storage management device in the third embodiment.

FIG. 15B is a diagram showing an example of a structure of the storage management device 2 in the third embodiment. In this embodiment, the storage management device 2 is only an input terminal for configuration information. Therefore, a GUI control program 213 and a configuration transmission program 215, which is executed by the CPU 204 in sending configuration contents inputted by the system administrator or the like to the master storage device 1, are stored in the main memory 201 of the storage management device 2. No table related to the present invention is stored in the disk device 203.

In the third embodiment, the system administrator or the like sets respective parameters on the remote copy task registration screen 700, which is displayed on the display 205, using the character input device 207 and the pointing device 206. Thereafter, when the system administrator or the like designates the button 716, the button 717, or the button 728, a configuration transmission program 215 is executed by the CPU 204, and the configuration contents are sent to the master storage device 1. Note that, in the third embodiment, the area 708 and the button 709 of the remote copy task registration screen 700 are unnecessary.

On the other hand, the master storage device 1, which has received the configuration contents, executes the configuration reception program 113 with the CPU 104 and registers a record in the task management table 221 and the path management table 222 or deletes a record from the tables on the basis of the configuration contents received from the storage management device 2. Contents of the record to be registered are the same as those in the path registration processing and the remote copy task registration processing illustrated in FIGS. 8B and 8C, respectively, except that nothing is registered in the entry 2223 of the path management table 222. Note that, in the third embodiment, since the network device 3 is not required to be managed in the storage management device 2, the network registration screen 600 is unnecessary.

Figure 16:
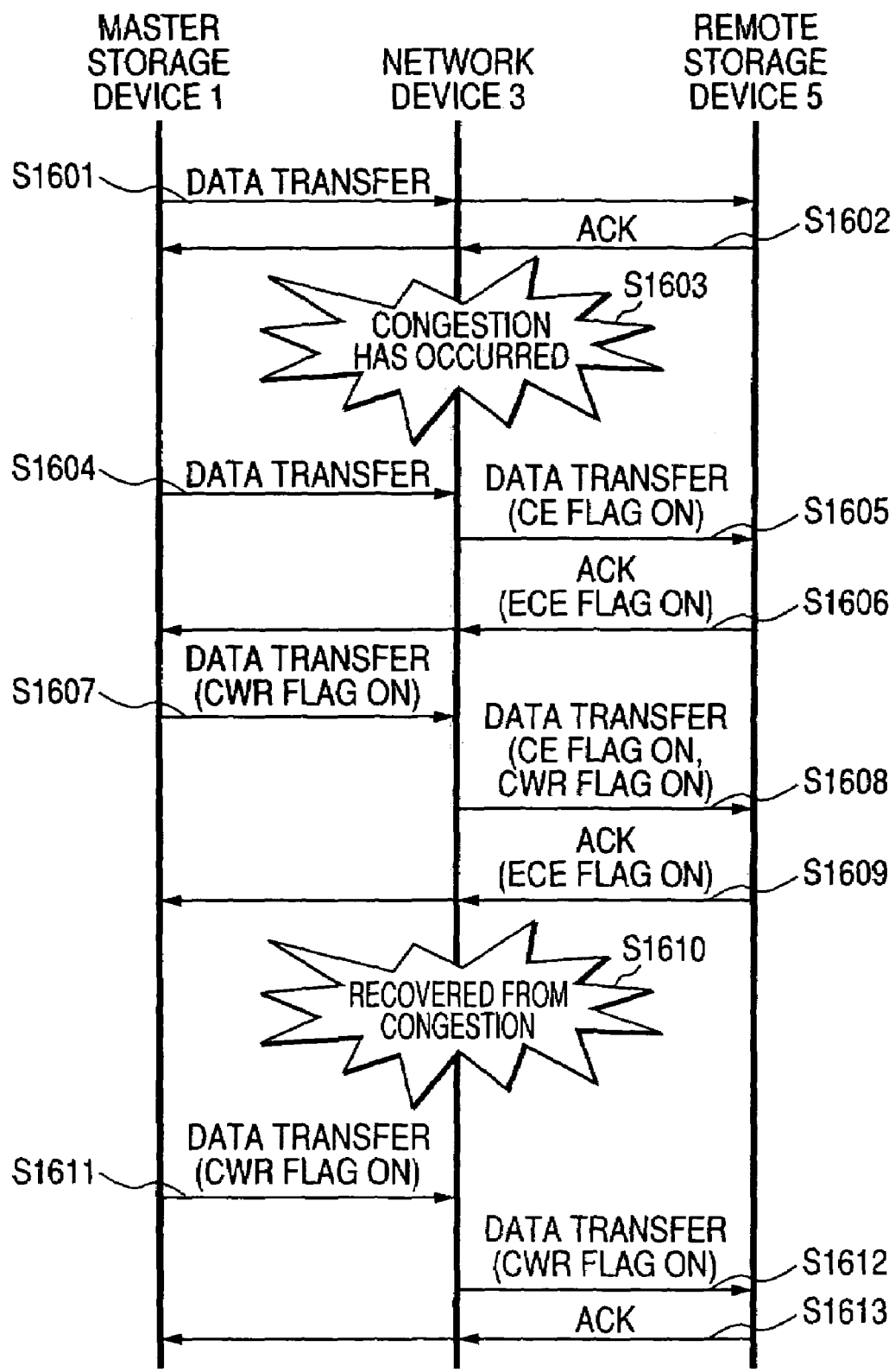
FIG. 16 is a diagram showing an example of a communication sequence in the third embodiment.

FIG. 16 is a diagram showing an example of a communication sequence among the respective devices in the third embodiment. Here, it is assumed that remote copy from the master storage device 1 to the remote storage device 5 is being carried out. Note that an initialization request, a start instruction, and the like for the remote copy are the same as the first embodiment. In addition, the ECN used in the third embodiment is extended specifications of the TCP, FIG. 16 illustrates processing up to communication of a TCP layer.

First, the master storage device 1 sends a packet including data, which is to be copied, to the remote storage device 5 in accordance with a default ratio among paths (S1601). Note that the master storage device 1 turns ON an ECT (ECN Capable Transport) flag for an IP header of the packet to be sent in S1601 in order to indicate that the ECN is used. After that, in the third embodiment, the master storage device 1 and the remote storage device 5 turn ON ECT flags for IP headers of all packets to be sent in the same manner.

When the packet is received, the network device 3 transfers the packet to the remote storage device 5 without change. The remote storage device 5, which has received the packet, sends an acknowledgement (hereinafter referred to as "ACK") to the master storage device 1 (S1602). When the ACK is received, the network device 3 transfers the ACK to the master storage device 1 without change.

Thereafter, in the case in which congestion has occurred in the network device 3 (S1603), the master storage device 1 sends a packet including data, which is to be copied, to the remote storage device 5 (S1604). Then, the network device 3, which has received the packet, confirms that an ECT flag for an IP header of the received packet is ON and, after turning ON a CE (Congestion Experienced) flag of the packet, transfers the packet to the remote storage device 5. Here, the CE flag is a flag for an IP header for the network device 3 to communicate presence or absence of congestion to endpoints and is defined in RFC 3168 (S1605).

The remote storage device 5, which has received the packet with the CE flag ON, sends an ACK with an ECE (ECN Echo) flag ON to the master storage device 1. Here, the ECE flag is a flag for a TCP header for exchanging information on presence or absence of congestion among endpoints performing TCP/IP communication and is defined in RFC3168 (S1606). The network device 3 transfers the ACK to the master storage device 1.

Figure 17:
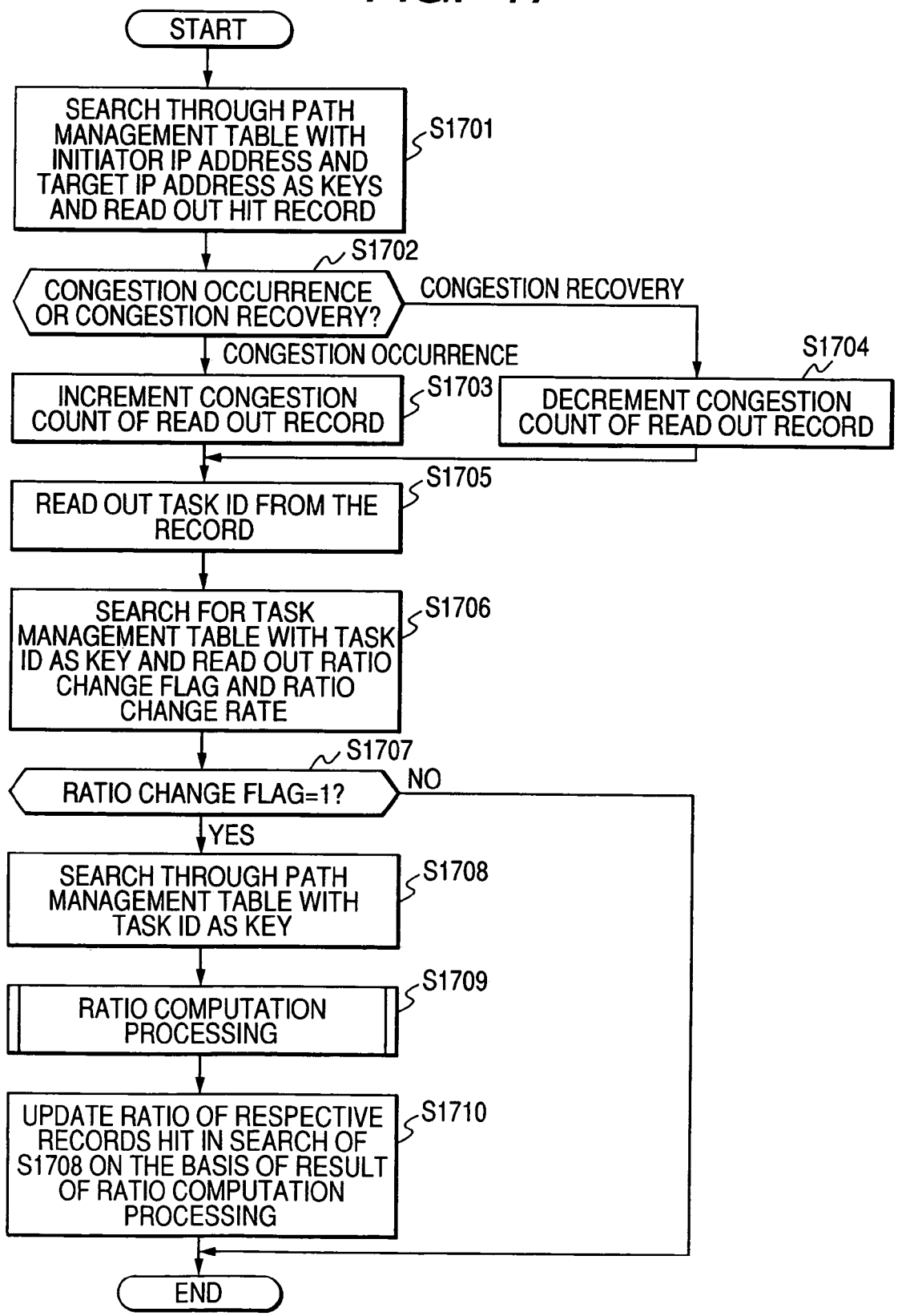
FIG. 17 is a flowchart showing an operation of path management table update processing in the third embodiment.

The master storage device 1, which has received the ACK with the ECE flag for the TCP header ON, considers that congestion has occurred in the WAN 8 and executes path management table update processing to be illustrated in FIG. 17 and the ratio computation processing illustrated in FIG. 12. The master storage device 1, which has obtained a ratio of paths after change as a result of the processing, changes the ratio among paths and then sends a packet including data, which is to be copied, to the remote storage device 5 (S1607).

In this case, the master storage device 1 turns ON a CWR (Congestion Window Reduced) flag for a TCP header of the packet to be sent in S1607. Here, the CWR flag is a flag for a TCP header for communicating that a measure for congestion has been executed among the endpoints performing the TCP/IP communication and is defined in RFC3168.

The network device 3, which has received this packet, turns ON the CE flag and transfers the packet to the remote storage device 5 because the congestion is still continuing (S1608). When the packet with the CWR flag and the CE flag ON is received, the remote storage device 5 sends an ACK with the ECE flag ON to the master storage device 1 in the same manner as S1606 (S1609).

Thereafter, when the network device 3 is recovered from the congestion which has occurred therein (S1610) and the master storage device 1 sends a packet including data, which is to be copied, to the remote storage device 5 (S1611), the network device 3, which has received the packet, transfers the packet to the remote storage 5 keeping the CE flag OFF (S1612).

When the packet with the CE flag OFF is received, the remote storage device 5 sends an ACK with the ECE flag OFF to the master storage device 1 (S1613). The master storage device 1, which has received the ACK with the ECE flag OFF, considers that the WAN 8 is recovered from the congestion and executes the path management table update processing to be illustrated in FIG. 17 and the ratio computation processing illustrated in FIG. 12. As a result, the master storage device 1 returns the ratio among paths to the original ratio to perform data transfer.

FIG. 17 is a flowchart showing operation procedures of the path management table update processing of the master storage device 1 in the third embodiment. Note that processing described below is executed as the ratio computation program 115 is executed by the CPU 104.

First, the master storage device 1 searches through the path management table 222 with a condition that a value registered in the entry 2227 agrees with a destination IP address of the received packet and a value registered in the entry 2228 agrees with a source IP address of the received packet, and reads out a record corresponding to the search condition. Here, the destination IP address of the received packet is an IP address of the master storage device 1, and the source IP address is an IP address of the remote storage device 5 (S1701).

Next, the master storage device 1 judges whether contents of the received packet indicate congestion occurrence or congestion recovery. More specifically, the master storage device 1 judges that the contents indicate the congestion occurrence if an ECE flag of a TCP header of the received packet is ON, and the contents indicate the congestion recovery if the ECE flag is OFF (S1702). In the case of the congestion occurrence, the master storage device 1 adds 1 to a value of a congestion count (entry 2226) of the record read out in S1701 (S1703). On the other hand, in the case of the congestion recovery, the master storage device 1 subtracts 1 from the value of the congestion count (entry 2226) of the record read out in S1701 (S1704).

After addition or subtraction of the congestion count, the master storage device 1 reads out a task ID (entry 2222) from the record (s1705). Thereafter, the master storage device 1 searches through the task management table 221 with a condition that a value registered in the entry 2211 agrees with the task ID read out in S1705 and reads out a ratio change flag (entry 2216) and a ratio change rate (entry 2217) of a record matching the search condition (s1706).

Next, the master storage device 1 judges whether a value of the read-out ratio change flag is "0" or "1" (S1707). If the ratio change flag is "0", the master storage device 1 ends the path management table update processing. On the other hand, if the ratio change flag is "1", the maser storage device 1 searches through the path management table 222 with a condition that a value registered in the entry 2222 agrees with the task ID read out in S1705 and reads out all records matching the search condition (S1708).

Thereafter, the master storage device 1 executes the ratio computation processing illustrated in FIG. 12 (S1709). The master storage device 1 updates values of ratios (entry 2225) of the respective records read out in S1708 (S1710) and ends the path management table update processing.

The third embodiment has been described. According to the third embodiment, the network device 3 directly notifies the master storage device 1 of congestion occurrence and congestion recovery, whereby increases in a CPU load of the storage management device 2 and a traffic amount between the storage management device 2 and the other devices can be prevented compared with the first embodiment.

Next, a fourth embodiment will be described concerning differences from the third embodiment only. In the third embodiment, the network device 3 notifies the master storage device 1 of congestion occurrence and congestion recovery using the ECN. In this embodiment, the master storage device 1 itself is configured to detect congestion occurrence and congestion recovery.

In the fourth embodiment, the master storage device 1 considers that congestion has occurred in the case in which an ACK, which is sent from the remote storage device 5 in a TCP connection used for remote copy, is not returned when time is out, that is, when a fixed period has elapsed or in the case in which three or more ACKs having the same sequence number have been received. These operations are based upon specifications of TCP defined by RFC793 and RFC2581, respectively.

In the case in which congestion occurrence is detected by the above-mentioned operation, the master storage device 1 performs the path management table update processing and the ratio computation processing described in FIGS. 10, 11 and 12 and executes remote copy using a ratio among paths after change which is obtained as a result of the processing.

On the other hand, the RFC does not define with which opportunity it is considered that congestion recovery has taken place. Thus, in the fourth embodiment, for example, it is assumed to be considered that congestion recovery has taken place when a time set by the system administrator or the like in advance has elapsed after congestion occurrence. Alternatively, it may be considered that congestion recovery has taken place when a congestion window size of a TCP connection has exceeded a size set by the system administrator or the like in advance. In the case in which congestion recovery is detected by the above-mentioned operation, the master storage device 1 performs the path management table update processing and the ratio computation processing illustrated in FIGS. 10, 11 and 12 and executes remote copy using a ratio among paths after change which is obtained as a result of the processing.

The fourth embodiment has been described. According to the fourth embodiment, the master storage device 1 detects congestion occurrence and congestion recovery autonomously, whereby a ratio among paths can be changed without depending upon the network device 3.

Next, a fifth embodiment will be described concerning differences from the first embodiment only. The fifth embodiment relates to a system in which the present invention is applied to the host-to-storage communication, that is, reading and writing of data executed between a host and a storage device (hereinafter referred to as "host I/O"). In the fifth embodiment, it is assumed that the host establishes one iSCSI session consisting of one or more TCP connections with the storage device to execute the host I/O. A route, on which a packet to be sent using a TCP connection passes, corresponds to a path.

Figure 18:
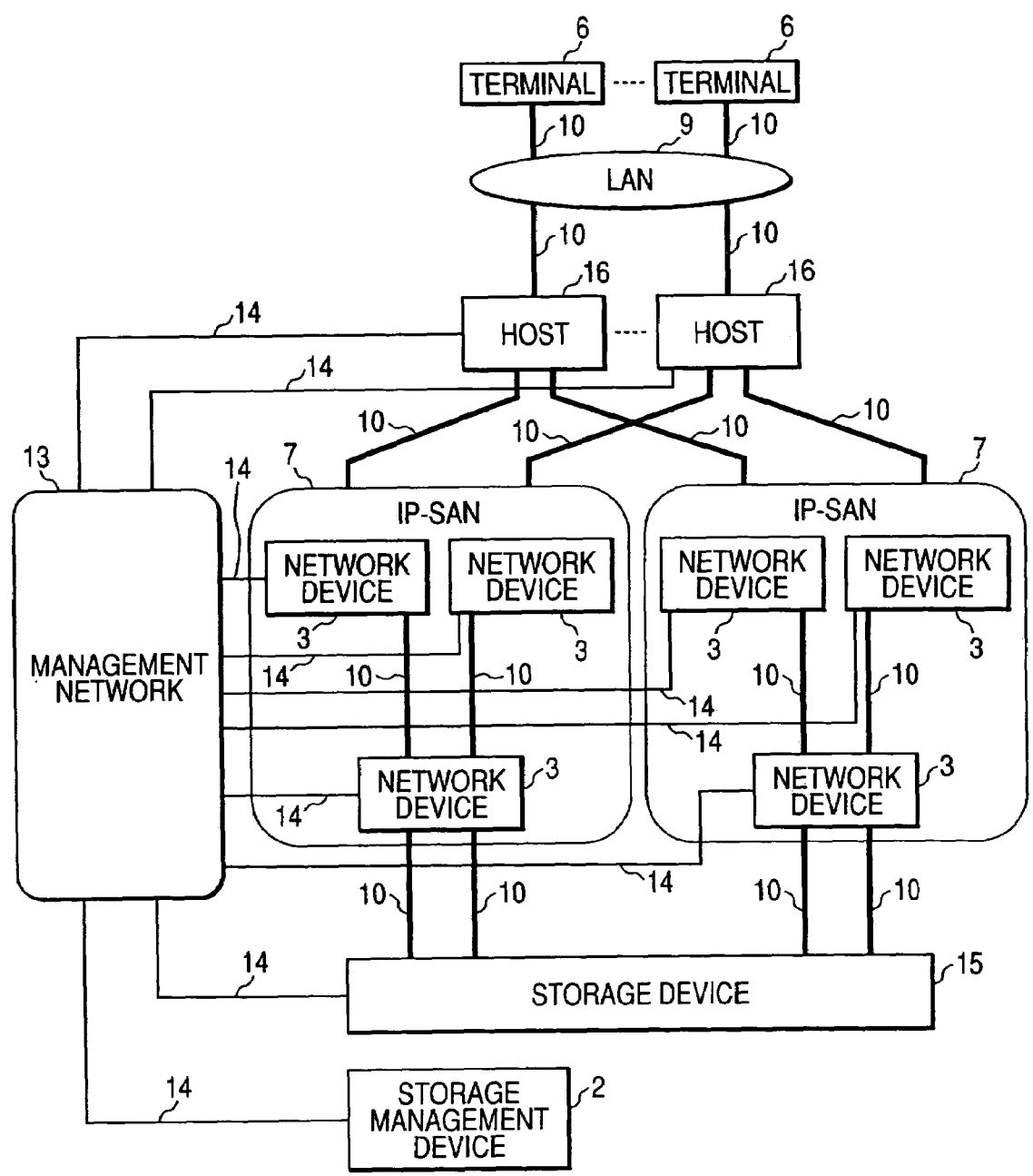
FIG. 18 is a diagram showing an example of a system structure in the fifth embodiment.

FIG. 18 is a diagram showing an example of a system structure of the fifth embodiment. The system includes: a storage device 15 which stores data; hosts 16 which read out data from the storage device 15 and write data therein; terminals 6; a storage management device 2; IP-SANs 7 which have network devices 3 connecting the hosts 16 and the storage device 15; a LAN 9 which connects the terminals 6 and the hosts 16; and management network 13 which connects the hosts 16, the storage device 15, the storage management device 2, and the network devices 3.

In addition, the hosts 16 and the storage device 15 are connected to the IP-SANs 7 by communication lines 10. Similarly, the terminals 6 and the hosts 16 are connected to the LAN 9 by the communication lines 10. Moreover, the hosts 16, the storage device 15, the storage management device 2, and the network device 3 are connected to the management network 13 by communication lines 14. Note that, as described in the first embodiment as well, the IP-SANs 7 may also function as the LAN 9.

Figure 19:
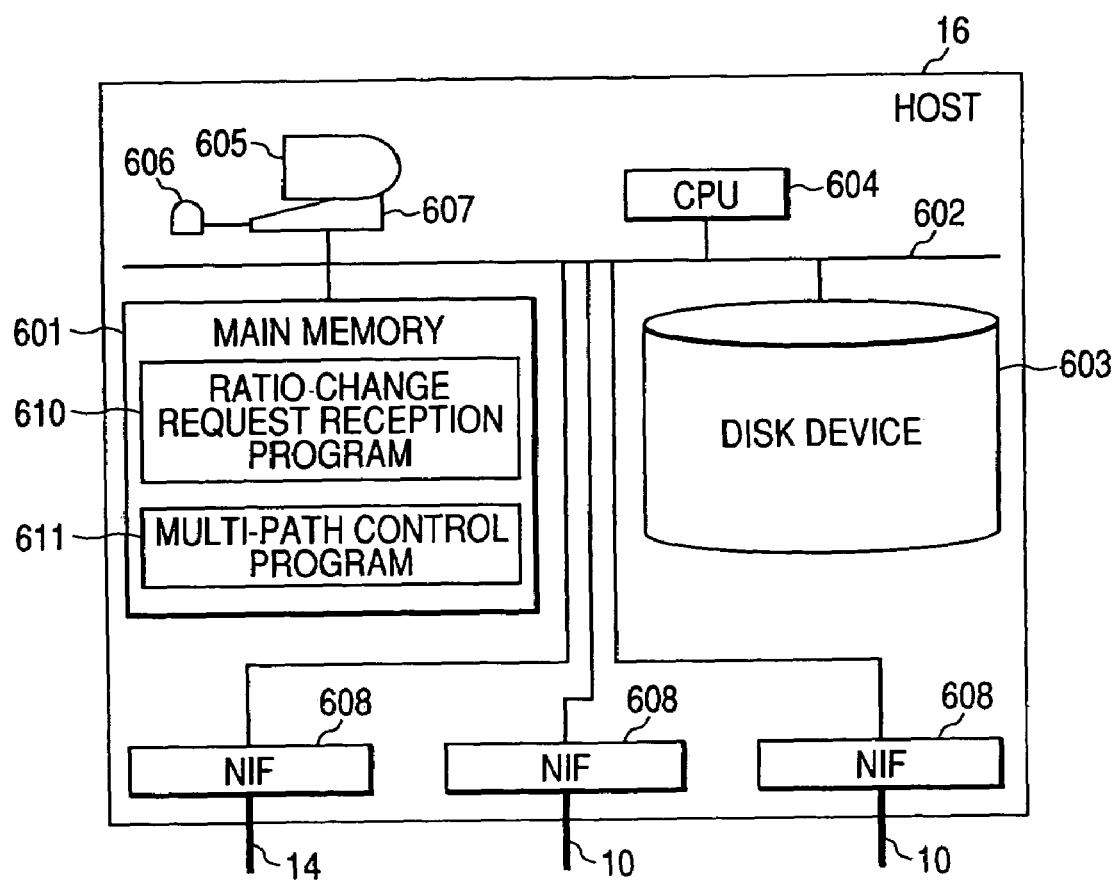
FIG. 19 is a diagram showing an example of a structure of a host in the fifth embodiment.

FIG. 19 is a diagram showing an example of a structure of the host 16. The host 16 includes: a main memory 601; a communication line 602; a disk device 603; a CPU 604; a display 605; a pointing device 606; a character input device 607; and a plurality of NIFs 608. One or more NIFs 608 are connected to the management network 13 via the communication lines 14, and the remaining one or more NIFs 608 are connected to the IP-SANs 7 via the communication lines 10.

In the main memory 601, a ratio change request reception program 610, which is executed by the CPU 604 in receiving a ratio change request from the storage management device 2, and a multi-path control program 611, wish is executed by the CPU 604 in determining a path to be used when data is read out or written in the storage device 15, are stored.

The storage device 15 is a storage device system which includes a single storage or a plurality of storages.

Structures of the storage management device 2 and the network device 3 are the same as those in the first embodiment. In addition, the terminals 6 are general computers, which have a CPU, a main memory, an input/output device, NIFs for making connection with the other devices via the communication line 10, and the like.

Data structures of various tables in the fifth embodiment and processing of the storage management device 2 at the time when various kinds of information are registered by a GUI or an operation of the GUI are the same as those in the first embodiment.

A communication sequence among the respective devices in the fifth embodiment is the same as that in the first embodiment except that the master storage device 1 is replaced with the host 16 and that the remote storage device 5 is replaced with the storage device 15.

In other words, instead of the master storage device 1, the host 16 receives a ratio change request for a path from the storage management device 2 to change a ratio.

Path management table update processing and ratio computation processing in the fifth embodiment are the same as those in the first embodiment.

The fifth embodiment has been described. According to the fifth embodiment, in the system in which the host 16 executes host I/O based upon an iSCSI protocol using a plurality of paths between the host 16 and the storage device 15, when congestion has occurred in the network device 3 on a certain path, the network device 3, the storage management device 2, and the host 16 exchange information on the congestion, whereby a ratio of load balancing of a path, in which a transmission rate has declined as a result of the congestion occurrence, can be lowered. Consequently, as in the first embodiment, decline in throughput related to communication can be controlled to be minimum.

Next, a sixth embodiment will be described concerning differences from the fifth embodiment only. In the sixth embodiment, as in the second embodiment, the storage management device 2 periodically reads out the number of discarded packets from the network device 3 to thereby detect congestion occurrence and congestion recovery.

Structures of the storage management device 2 and the network device 3 in the sixth embodiment are the same as those in the second embodiment.

A communication sequence among the respective devices in the sixth embodiment is the same as that in the second embodiment except that the master storage device 1 is replaced with the host 16 and that the remote storage device 15 is replaced with the storage device 15.

The sixth embodiment has been described. According to the sixth embodiment, in the system in which the host 16 executes writing and reading of data based upon an iSCSI protocol using a plurality of paths between the host 16 and the storage device 15, when congestion has occurred in the network device 3 on a certain path, the host 16 which has received a ratio change request from the storage management device 2 can lower a ratio of paths in which a transmission rate has declined as a result of the congestion occurrence. Consequently, as in the first embodiment, decline in throughput related to communication can be controlled to be minimum even in the system including the network device 3 without a function for sending a congestion occurrence notification and a congestion recovery notification.

Next, a seventh embodiment will be described concerning differences from the fifth embodiment only. In the seventh embodiment, as in the third embodiment, the network device 3 notifies the host 16 of congestion occurrence and congestion recovery using an ECN or the like.

A structure of the host 16 in the seventh embodiment is the same as that in the fifth embodiment except that a configuration reception program 612, a congestion reception program 613, and a ratio computation program 614 are stored in the main memory 601 and that a task management table 221 and a path management table 222 are stored in the disk device 603.

A structure of the storage management device 2 in the seventh embodiment is the same as that in the third embodiment.

In the seventh embodiment, as in the third embodiment, the configuration transmission program 215, which is executed by the CPU 204, sends respective parameters, which are set by a system administrator or the like on the remote copy task registration screen 700, to the host 16. Then, the configuration reception program 612, which is executed by the CPU 604 of the host 16, receives the parameters and registers contents of the parameters in records of various tables.

A communication sequence among the respective devices in the seventh embodiment is the same as that in the third embodiment except that the master storage device 1 is replaced with the host 16 and that the remote storage device 5 is replaced with the storage device 15.

Operation procedures of path management table update processing of the host 16 in the seventh embodiment are the same as those in the third embodiment.

The seventh embodiment of the present invention has been described. According to the seventh embodiment, the network device 3 directly notifies the host 16 of congestion occurrence and congestion recovery using an ECN or the like, whereby decline in throughput related to communication can be controlled to be minimum evening the system including the device with the limited function of the storage management device 2.

Next, an eighth embodiment will be described concerning differences from the seventh embodiment only. In the eighth embodiment, as in the fourth embodiment, the host 16 itself detects occurrence of congestion and recovery from congestion.

In the eighth embodiment, as in the fourth embodiment, the host 16 considers that congestion has occurred in the case in which an ACK is not returned when time is out in a TCP connection used for reading and writing of data or in the case in which three or more ACKs having the same sequence number have been received.

On the other hand, it is considered that congestion recovery has taken place when a time set by the system administrator or the like in advance has elapsed after congestion occurrence or when a congestion window size of a TCP connection has exceeded a size set by the system administrator or the like in advance.

The eighth embodiment of the present invention has been described. According to the eighth embodiment, the host 16 detects congestion occurrence and congestion recovery autonomously, whereby decline in throughput related to communication can be controlled to be minimum without depending upon the network device 3.

According to the present invention, decline in packet transmission throughput of an entire system, more specifically, packet transfer throughput between a host and a storage device or between a storage device and a storage device can be controlled to be minimum.

What is claimed is:

1. A system comprising:
   a first device;
   a second device;
   a plurality of paths each being connected between the first device and the second device; and
   a third device which is connected to the first device,
   wherein the first device transfers data, using a plurality of packets, to the second device across the plurality of paths,
   wherein each of the packets includes an address of the first device as a source address, an address of the second device as a destination address and a portion of the data to be transferred from the first device to the second device,
   wherein the number of packets transferred on each path of the plurality of paths is set according to a predetermined ratio for said each path,
   wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from the first device to the second device,
   wherein when the third device detects congestion of packets on one path of the plurality of paths, the third device notifies the first device of the congestion on the one path,
   wherein the first device changes the predetermined ratio of each of the paths, thereby changing the amount of packets to be allocated to each of the plurality of paths, based on notification from said third device of the congestion on the one path,
   wherein the first device transfers data, using the packets, to the second device across the plurality of paths according to the changed predetermined ratio of each of the paths,
   wherein said first device and the second device are storage devices each having a disk drive for storing data,
   wherein the third device has information on the predetermined ratio and a change rate to be applied to the predetermined ratio of each of the paths to compute the changed predetermined ratio of each of the paths, when a change in the predetermined ratio of each of the oaths is required, said change rate being a predetermined minimum value the predetemined ratio is to be increased or decreased when changed,
   wherein the third device, when congestion on the one path has been detected, computes the changed predetermined ratio on each of the paths based on the change rate, and sends information on the changed predetermined ratio of each of the paths to the first device, and
   wherein the first device transfers data, using packets, to the second device across the plurality of paths based on the changed predetermined ratio of each of the paths.

2. A system according to claim 1, wherein each of the plurality of paths has a network device for connecting the first device and the second device,
   wherein the third device is connected to the network device via a network, and
   wherein third device receives information on a discarded packet in the network device from the network device via the network and judges congestion of the plurality of paths based on the information on the discarded packet.

3. A system according to claim 2, wherein, in the case in which the number of discarded packets received from the network device is larger than the number of discarded packets received previously, the third device judges that congestion has occurred in the plurality of paths having the network device.

4. A system according to claim 1, wherein when the third device detects recovery from congestion on the one path, the third device computes the changed predetermined ratio for each of the paths based on the change rate, and sends information on the changed predetermined ratio of each of the paths to the first device, and
   wherein the first device transfers data, using the packets, to the second device across the plurality of paths based on the changed predetermined ratio of each of the paths.

5. A system according to claim 1, wherein said third device when computing the changed predetermined ratio, performs processing for reducing a ratio on each of the paths, which is assigned to a path in which congestion has occurred, at a designated change rate and allocates the reduced amounts to the other paths.

6. A system according to claim 5, wherein said third device when computing the changed predetermined ratio includes:
   means for, in a case in which a same number of congestion has occurred in all paths being used, and in a case in which all paths are recovered from the congestion, performing a process for returning the changed predetermined ratio on each of the paths to a default value.

7. A system according to claim 1, wherein said third device when computing the changed predetermined ratio includes:
   means for, upon detecting that a congestion has occurred on a path,
   calculating a ratio being used on the path at the time of congestion and a difference between the ratio at the time of congestion and a ratio set in advance for the path upon which the congestion has occurred and allocating the difference to ratios of the other paths.

8. A system according to claim 1, further comprising:
means for managing a ratio change flag and a ratio change rate by use of a task management table, managing a default ratio and a changed ratio by use of a path management table and updating the predetermined ratio in a path management table in accordance with the change rate in the task management table.

9. A system according to claim 1, further comprising:
a function for recovering a path using the predetermined ratio for said path.

10. A system comprising:
a first device;
a second device;
a plurality of paths each being connected between the first device and the second device, the plurality of paths being external of each of the first and second devices; and
a third device which is connected to the first device,
wherein the first device transfers data, using a plurality of packets, to the second device across the plurality of paths at a predetermined ratio for each of the paths,
wherein each of the packets includes an address of the first device as a source address, an address of the second device as a destination address and a portion of the data to be transferred from the first device to the second device,
wherein the number of packets transferred on each path of the plurality of paths is set according to said predetermined ratio for said each path,
wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from the first device to the second device,
wherein when the third device detects congestion of packets on one path of the plurality of paths, the third device notifies the first device of the congestion on the one path,
wherein the first device changes the predetermined ratio of each of the paths, thereby changing the amount of packets to be allocated to each of the plurality of paths, based on notification from said third device of the congestion on the one path,
wherein the first device transfers data, using the packets, to the second device across the plurality of paths according to the changed predetermined ratio of each of the paths,
wherein the first device is a computer, and the second device is a storage device having a disk drive for storing data,
wherein the third device has information on the predetermined ratio and a change rate to be applied to the predetermined ratio of each of the paths to compute the changed predetermined ratio of each of the paths, when a change in the predetermined ratio of each of the paths is required, said change rate being a predetermined minimum value the predetermined ratio is to be increased or decreased when changed,
wherein the third device, when congestion on the one path has been detected, computes the changed predetermined ratio on each of the paths based on the change rate, and sends information on the changed predetermined ratio of each of the paths to the first device, and
wherein the first device transfers data, using packets, to the second device across the plurality of paths based on the changed predetermined ratio of each of the paths.

11. A system according to claim 10, wherein each of the plurality of paths has a network device for connecting the first device and the second device,
wherein the third device is connected to the network device via a network, and
wherein the third device receives a notification of occurrence of congestion in the network device from the network device via the network.

12. A system according to claim 11, wherein the notification is a notification based upon SNMP Trap.

13. A system according to claim 10, further comprising:
means for managing a ratio change flag and a ratio change rate by use of a task management table, managing a default ratio and a changed ratio by use of a path management table and updating the predetermined ratio in a path management table in accordance with the change rate in the task management table.

14. A system according to claim 10, further comprising:
a function for recovering a path using the predetermined ratio for said path.

15. A system comprising:
a first device;
a second device; and
a plurality of paths each being connected between the first device and the second device,
wherein the first device transfers data, using a plurality of packets, to the second device across the plurality of paths at a predetermined ratio for each of the paths,
wherein each of the packets includes an address of the first device as a source address, an address of the second device as a destination address and a portion of the data to be transferred from the first device to the second device,
wherein the number of packets transferred on each path of the plurality of paths is set according to said predetermined ratio for said each path,
wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from the first device to the second device,
wherein the first device detects congestion of packets on one path of the plurality of paths,
wherein the first device changes the predetermined ratio on each of the paths, thereby changing the amount of packets communications to be allocated on each of the plurality of paths, according to the detection of the congestion of packets on the one path of the plurality of paths by the first device,
wherein the first device transfers data, using the packets, to the second device across the plurality of paths according to the changed predetermined ratio of each of the paths,
wherein the first device and the second device are storage devices each having a disk drive for storing data,
wherein the first device has information on the predetermined ratio and a change rate to be applied to the predetermined ratio of each of the paths to compute the changed predetermined ratio of each of the paths when a change in the predetermined ratio of each of the paths is required, said change rate being a predetermined minimum value the predetemined ratio is to be increased or decreased when changed, wherein the first device, when congestion of packets on the one path of the plurality of paths has been detected, and computes the changed predetermined ratio on each of the paths based on the change rate, and wherein the first device transfers data, using packets, to the second device across the plurality of paths based on the changed predetermined ratio of each of the paths.

16. A system according to claim 15, wherein each of the plurality of paths has a network device for connecting the first device and the second device, and wherein the first device receives a notification of occurrence of congestion in the network device from the network device via the plurality of paths.

17. A system according to claim 16, wherein the notification is a flag based upon Explicit Congestion Notification (ECN).

18. A system according to claim 15, wherein, when a data size, which can be sent to the plurality of paths in which the congestion has occurred, has exceeded a value set in advance after the congestion occurrence, the first device judges that the plurality of paths has recovered from the congestion.

19. A system according to claim 15, further comprising:
means for managing a ratio change flag and a ratio change rate by use of a task management table, managing a default ratio and a changed ratio by use of a path management table and updating the predetermined ratio in a path management table in accordance with the change rate in the task management table.

20. A system according to claim 15, further comprising:
a function for recovering a path using the predetermined ratio for said path.

21. A system comprising:
a first device;
a second device; and
a plurality of paths each being connected between the first device and the second device, the plurality of paths being external of each of the first and second devices, wherein the first device transfers data using a plurality of packets, to the second device across the plurality of paths at a predetermined ratio of each of the paths, wherein each of the packets includes an address of the first device as a source address, an address of the second device as a destination address and a portion of the data to be transferred from the first device to the second device, wherein the number of packets transferred on each path of the plurality of paths is set according to said predetermined ratio for said each path, wherein said predetermined ratio for said each path defines an amount of packets to be allocated on said each path relative to a total amount of packets on all of the paths so that packets on each of the plurality of paths are adjusted relative to the packets on each of the other paths such that a total amount of packets across the plurality of paths carries sufficient data equal to a total of the data to be transferred from the first device to the second device, wherein the first device detects congestion on one path of the plurality of paths, wherein the first device changes the predetermined ratio of each of the paths, thereby changing the amount of packets to be allocated on each of the plurality of paths, according to the detection of the congestion on the one path of the plurality of paths by the first device, wherein the first device transfers data, using the packets, to the second device across the plurality of paths according to the changed predetermined ratio of each of the paths, wherein the first device is a computer, and the second device is a storage device having a disk drive for storing data, wherein the first device has information on the predetermined ratio and a change rate to be applied to the predetermined ratio of each of the paths to compute the changed predetermined ratio of each of the paths, when a change in the predetermined ratio of each of the paths is required, said change rate being a predetermined minimum value the predetermined ratio is to be increased or decreased when changed, wherein the first device, when congestion of the one path of the plurality of paths has been detected, computes the changed predetermined ratio of each of the paths based on the change rate, and wherein the first device transfers data, using the packets, to the second device across the plurality of paths based on the changed predetermined ratio of each of the paths.

22. A system according to claim 21, wherein, in the case in which a response is not returned from the second device for a predetermined period, the first device judges that congestion has occurred in the plurality of paths.

23. A system according to claim 21, wherein, in the case in which an acknowledgement of the data sent to the second device has been received redundantly, the first device judges that congestion has occurred in the plurality of paths.

24. A system according to claim 21, further comprising:
means for managing a ratio change flag and a ratio change rate by use of a task management table, managing a default ratio and a changed ratio by use of a path management table and updating the predetermined ratio in a path management table in accordance with the change rate in the task management table.

25. A system according to claim 21, further comprising:
a function for recovering a path using the predetermined ratio for said path.

26. A storage system comprising:
a control unit;
a disk device which is connected to the control unit; and
an interface which is connected to a network which is connected between said interface of said storage system and another storage system, wherein the interface is connected to said another storage system by a plurality of paths in the network, wherein the control unit sends data stored in the disk device as packets to said another storage system using the plurality of paths at a predetermined ratio for each of the paths, wherein each of the packets includes an address of said storage system as a source address, an address of said another storage system as a destination address and a portion of the data to be transferred from said storage system to said another storage system, wherein the number of packets transferred on each path of the plurality of paths is set according to said predetermined ratio for said each path, wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from said storage system to said another storage system, wherein, in the case in which an acknowledgement for a packet sent to said another storage system on one of the plurality of pats has not been received for a fixed period, the control unit judges that congestion of packets has occurred on the one path of the plurality of paths, wherein the control unit changes the predetermined ratio on each of the paths, thereby changing the amount of packets to be allocated on each of the plurality of paths, according to the occurrence of the congestion on the one path and performs packet transfer of data to said another storage system according to the changed predetermined ratio of each of the paths, wherein the control unit has information on the predetermined ratio and a change rate to be applied to the predetermined ratio of each of the paths to compute the changed predetermined ratio of each of the paths when a change in the predetermined ratio of each of the paths is required, said change rate being a predetermined minimum value the predetermined ratio is to be increased or decreased when changed, wherein the control unit, when congestion of packets on the one path of the plurality of paths has been detected, computes the changed predetermined ratio of each of the paths based on the change rate, and wherein the control unit transfers data, using the packets, to said another storage system across the plurality of paths based on the changed predetermined ratio of each of the paths.

27. A storage system according to claim 26, further comprising:

means for managing a ratio change flag and a ratio change rate by use of a task management table, managing a default ratio and a changed ratio by use of a path management table and updating the predetermined ratio in a path management table in accordance with the change rate in the task management table.

28. A storage system according to claim 26, further comprising:

a function for recovering a path using the predetermined ratio for said path.

29. A system comprising:

a first storage device having a disk drive for storing data;

a second storage device having a disk drive for storing data;

a plurality of paths each connected between the first storage device and the second storage device; and a computer which is connected to the first storage device, wherein a switch is included in the plurality of paths, wherein the first storage device transfers data, using a plurality of packets, to the second storage device across the plurality of paths at a predetermined ratio of each of the paths, wherein each of the packets includes an address of the first device as a source address, an address of the second device as a destination address and a portion of the data to be transferred from the first device to the second device, wherein the number of packets transferred on each path of the plurality of paths is set according to said predetermined ratio for said each path, wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from the first device to the second device, wherein the computer detects congestion of packets on one path of the plurality of paths based on a notification from the switch and notifies the first storage device of a changed predetermined ratio for each of the paths to be used after detection of the congestion on the one path, wherein the first storage device changes the predetermined ratio of each of the paths to the changed predetermined ratio of each of the paths, thereby changing the amount of packets to be allocated on each of the plurality of paths, based on the changed predetermined ratio of each of the paths from the computer and transfers data, using the packets, to the second storage device across the plurality of paths according to the changed predetermined ratio of each of the paths, wherein the computer has information on the predetermined ratio and a change rate to be applied to the predetermined ratio of each of the paths to compute the changed predetermined ratio of each of the paths when a change in the predetermined ratio of each of the paths is required, said change rate being a predetermined minimum value the predetermined ratio is to be increased or decreased when changed, wherein the computer, when congestion of packets on the one path of the plurality of paths has been detected, computes the changed predetermined ratio of each of the paths based on the change rate, and sends information on the changed predetermined ratio of each of the paths to the first storage device, wherein the first storage device transfers data, using the packets, to the second storage device across the plurality of paths based on the changed predetermined ratio of each of the paths, wherein the computer judges recovery from the congestion on the one path and notifies the first storage device of a further changed predetermined ratio of each of the paths, and wherein the first storage device changes the changed predetermined ratio of each of the paths to the further changed predetermined ratio of each of the paths and transfers data, using the packets, to the second storage device across the plurality of paths according to the further changed predetermined ratio of each of the paths.

30. A system according to claim 29, further comprising:

means for managing a ratio change flag and a ratio change rate by use of a task management table, managing a default ratio and a changed ratio by use of a path management table and updating the predetermined ratio in a path management table in accordance with the change rate in the task management table.

31. A system according to claim 29, further comprising:

a function for recovering a path using the predetermined ratio for said path.

32. A storage system comprising:

a control unit;

a disk device which is connected to the control unit; and an interface which is connected to a network which is connected between said interface of said storage system and of a plurality of other devices, wherein said network is external of each of said storage system and the other devices, wherein the interface is connected to the other devices by a plurality of paths in the network, wherein the control unit sends data stored in the disk device, using a plurality of packets, to the other devices across the plurality of paths at a predetermined ratio for each of the paths, wherein each of the packets includes an address of said storage system as a source address, addresses of the other devices as destination addresses and a portion of the data to be transferred from said storage system to the other devices, wherein the number of packets transferred on each path of the plurality of paths is set according to said predetermined ratio for said each path, wherein said predetermined ratio for said each path defines an amount of packets to be allocated on said each path relative to a total amount of packets on all of the paths so that packets on said each path of the plurality of paths are adjusted relative to the packets on each of the other paths such that a total amount of packets across the plurality of paths carries sufficient data equal to a total of the data to be transferred from said storage system to the other devices, wherein, in the case in which an acknowledgement for a packet sent to the other devices on one path of the plurality of paths has not been received for a fixed period, the control unit judges that congestion has occurred on the one path of the plurality of paths, wherein the control unit changes the predetermined ratio of each of the paths, thereby changing the amount of packets to be allocated on each of the plurality of paths, according to the occurrence of the congestion on the one path and performs packet transfer of data to the other devices at the changed predetermined ratio of each of the paths, wherein the control unit has information on the predetermined ratio and a change rate to be applied to the predetermined ratio of each of the paths to compute the changed predetermined ratio of each of the paths when a change in the predetermined ratio of each of the paths is required, said change rate being a predetermined minimum value the predetermined ratio is to be increased or decreased when changed, wherein the control unit, when congestion on the one path of the plurality of paths has been detected, computes the changed predetermined ratio of each of the paths based on the change rate, and wherein the control unit transfers data, using the packets, to the other devices across the plurality of paths based on the changed predetermined ratio of each of the paths.

33. A storage system according to claim 32, further comprising:

means for managing a ratio change flag and a ratio change rate by use of a task management table, managing a default ratio and a changed ratio by use of a path management table and updating the predetermined ratio in a path management table in accordance with the change rate in the task management table.

34. A storage system according to claim 32, further comprising:

a function for recovering a path using the predetermined ratio for said path.

* * * * *